(12) United States Patent
Terayama et al.

(10) Patent No.: US 11,184,411 B2
(45) Date of Patent: Nov. 23, 2021

(54) COMMUNICATION TERMINAL, COMMUNICATION SYSTEM, LOG DATA TRANSMISSION METHOD, AND NON-TRANSITORY COMPUTER-READABLE MEDIUM

(71) Applicants: Kazuhiro Terayama, Tokyo (JP); Kenichiro Morita, Tokyo (JP); Tatsuya Nagase, Kanagawa (JP); Takashi Hasegawa, Tokyo (JP); Shoichiro Kanematsu, Kanagawa (JP); Yoshikazu Goto, Kanagawa (JP)

(72) Inventors: Kazuhiro Terayama, Tokyo (JP); Kenichiro Morita, Tokyo (JP); Tatsuya Nagase, Kanagawa (JP); Takashi Hasegawa, Tokyo (JP); Shoichiro Kanematsu, Kanagawa (JP); Yoshikazu Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 68 days.

(21) Appl. No.: 16/527,516

(22) Filed: Jul. 31, 2019

(65) Prior Publication Data
US 2020/0067992 A1    Feb. 27, 2020

(30) Foreign Application Priority Data
Aug. 23, 2018  (JP) .............................. JP2018-156661

(51) Int. Cl.
*H04L 29/06* (2006.01)
*G06Q 30/02* (2012.01)

(52) U.S. Cl.
CPC ..... *H04L 65/1069* (2013.01); *G06Q 30/0203* (2013.01); *H04L 65/1073* (2013.01)

(58) Field of Classification Search
CPC ............ H04L 65/1069; H04L 65/1073; G06Q 30/0203
See application file for complete search history.

(56) References Cited

U.S. PATENT DOCUMENTS

| | | | |
|---|---|---|---|
| 7,783,750 B1 * | 8/2010 | Casey ..................... | H04L 67/36 709/224 |
| 2009/0089592 A1 * | 4/2009 | Kudo ..................... | H04L 9/3236 713/193 |
| 2012/0191860 A1 * | 7/2012 | Traversat ................ | H04L 67/28 709/226 |
| 2015/0039757 A1 * | 2/2015 | Petersen ................. | H04L 41/16 709/224 |
| 2015/0052188 A1 * | 2/2015 | Herberg ................ | H04L 67/104 709/203 |
| 2015/0317327 A1 * | 11/2015 | He ...................... | G06F 16/2272 707/693 |

(Continued)

FOREIGN PATENT DOCUMENTS

JP    2016-075974    5/2016

*Primary Examiner* — John A Follansbee
*Assistant Examiner* — Raqiul A Choudhury
(74) *Attorney, Agent, or Firm* — IPUSA, PLLC

(57) ABSTRACT

A communication terminal that receives at least one of image data and audio data from at least one other communication terminal via a network, the communication terminal including circuitry to generate log data in response to occurrence of an event at the communication terminal, and transmit the generated log data to an accumulation apparatus each time the event occurs.

11 Claims, 29 Drawing Sheets

(56) References Cited

U.S. PATENT DOCUMENTS

| | | | |
|---|---|---|---|
| 2016/0111010 A1* | 4/2016 | Adachi | G09B 7/00 |
| | | | 434/362 |
| 2016/0373944 A1* | 12/2016 | Jain | H04W 24/02 |
| 2017/0295246 A1* | 10/2017 | Georgiou | H04L 67/148 |
| 2018/0041958 A1* | 2/2018 | Narayanan | H04W 76/28 |
| 2018/0123809 A1* | 5/2018 | Sahu | H04L 12/12 |
| 2019/0026048 A1* | 1/2019 | Muehge | G06F 16/335 |
| 2019/0073257 A1* | 3/2019 | Dasgupta | G06F 16/258 |

\* cited by examiner

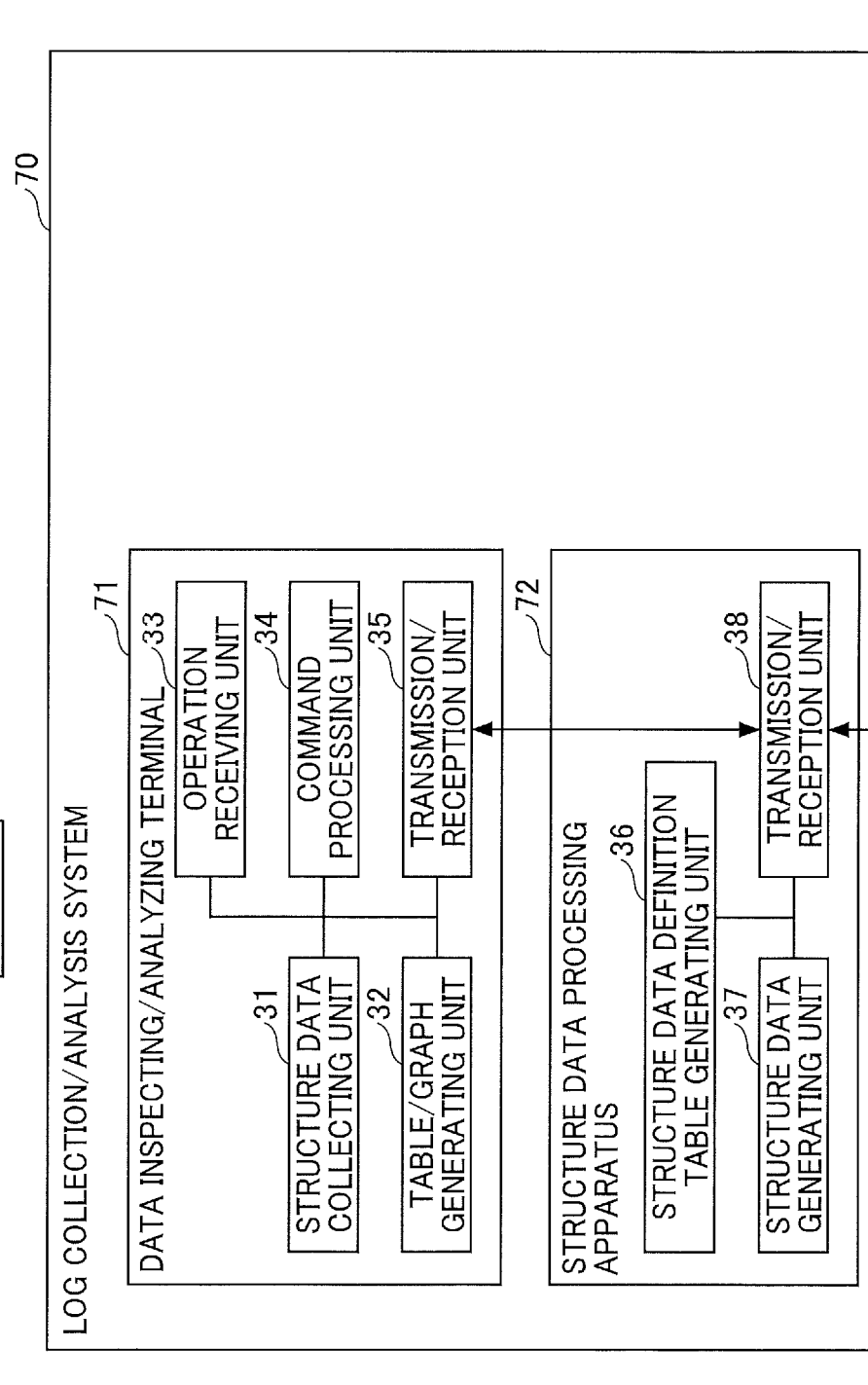

FIG. 7B

```
{ //COMMON DATA SET
key_1: value,
key_2: value, key_p: value,
layer_1:{  //CATEGORY-BASED HIERARCHICAL DATA SET
    key_1_1: value,
    key_1_2: value,
        ⋮
    key_1_q: value,
    layer_2:{
        key_2_1: value,
        key_2_2: value, key_2_r: value,
            ⋮
            layer_n:{
                key_n_1: value,
                key_n_2: value, key_n_s: value
            }
    }
}
```

FIG. 8B

```
{ //COMMON DATA SET
key_1: value,
key_2: value,
    ⋮
key_p: value,

// DEVELOP HIERARCHICAL STRUCTURE (ADD LAYER NAME AT HEAD OF key)
layer_1_key_1_1: value,
layer_1_key_1_2: value,
    ⋮
layer_1_key_1_q: value,
    ⋮
layer_1_layer_2_key_2_1: value,
layer_1_layer_2_key_2_2: value,
    ⋮
layer_1_layer_2_key_2_r: value,

⋮ layer_1_layer_2_···layer_n_key_n_1: value,
layer_1_layer_2_···layer_n_key_n_2: value,
    ⋮
layer_1_layer_2_···layer_n_key_n_s: value
}
```

FIG. 9

```
//COMMON DATA:
   // COMMON INFORMATION GIVEN TO ALL TYPES OF TERMINAL DATA. USEFUL FOR COLLECTING
   // CLASSIFICATIONS BASED ON EACH COMMON DATA ITEM OR FOR CROSS-REFERENCE ANALYSIS IN WHICH
   // DIFFERENT TYPES OF LOG DATA ITEMS ACCORDING TO CATEGORY ARE ASSOCIATED.
"log_id" : "XXXXXXX_XXXX-XX-XXXX-XX:XX.XXX_XXXXXX-XXXX-XX",  //LOG ID UNIQUE FOR EACH LOG
"user_id" : "XXXXXXXXXXX" , //USER ID
"product" : "XXXX-XXX",  //MODEL NAME
"xx_version" : "X.X.X" ,  //VERSION NUMBER OF SOFTWARE ETC.
"app_info" : "XXXX_XXXX_XXXX/X.X.X" ,  //INFORMATION OF SERVICE USAGE
"timestamp" : "XXXX-XX-XXXXX:XX:XX.XXXX",  //TIME OF OCCURRENCE OF EVENT (GENERATION OF LOG)
"func_id" : "XXXXXXXXX_XXXXXXXXXXX" ,  // FUNCTION ID OF GENERATOR OF LOG
"category" : "XXXXXXXXXXXX.XXXXXXX" ,  //CLASSIFICATION OF LOG
...ETC.
```

FIG. 10A

```
// [EXAMPLE] CONNECTION PROCESSING REQUEST LOG
"body" : {
    "comm_id" : "X-X-X-X" // COMMUNICATION SERVICE ID (ID UNIQUE FOR EACH COMMUNICATION CONNECTION)
    "comm_event_type" : "xx_xxxxxxxx_xxx",
    ...ETC.
}
```

FIG. 10B

```
// [EXAMPLE] CONNECTION PROCESSING RESPONSE LOG
"body" : {
    "comm_id" : "X-X-X-X", // COMMUNICATION SERVICE ID (ID UNIQUE FOR EACH COMMUNICATION CONNECTION)
    "comm_event_type" : "xx_xxxxxxxx_xxxxxx",
    ...ETC.
}
```

FIG. 11A

```
// [EXAMPLE] COMMUNICATION START LOG INCLUDING NETWORK ENVIRONMENT CONDITION AND OPERATION MODE SET IN ACCORDANCE WITH CONDITION
"body" : {
    "comm_id" : "X-X-X-X",  // COMMUNICATION SERVICE ID (ID UNIQUE FOR EACH COMMUNICATION CONNECTION)
    "comm_event_type" : "xxxxx_xxxxxxxxxxx",
    "network_protocol" : "xxx",
    "network_proxy" : "xxx",
    "network_connection" : "xxx",
    "xx_comm_mode" : "xxxxx_xxxxx",
    ...ETC.
}
```

FIG. 11B

```
// [EXAMPLE] COMMUNICATION END LOG
"body" : {
    "comm_id" : "X-X-X-X",  // COMMUNICATION SERVICE ID (ID UNIQUE FOR EACH COMMUNICATION CONNECTION)
    "comm_event_type" : "xxx_xxxxxxxxxx",
    "reason" : "xxxxx_xxxxxxxxx",  // REASON FOR DISCONNECTION, OR exited_by_server ETC.
    ...ETC.
}
```

FIG. 12A

```
// [EXAMPLE] COMMUNICATION ABNORMAL END LOG
// category is communication.error CONNECTION FAILURE, ABNORMAL END OF COMMUNICATION, ETC.
"body" : {
    "comm_id" : "X-X-X-X" , //COMMUNICATION SERVICE ID (ID UNIQUE FOR EACH COMMUNICATION CONNECTION)
    "comm_event_type" : "xxxxxxx_xxxxx" ,
    "error_name" : "xxxxx_xxxxxxxxx_xxxxx_xx" ,
    "error_type" : "xxxxxx" ,
    "error_description" : "xx xxxxx xxx xxxxx ,
    "state" : "xxx_xxxxx" , //STATE WHEN ABNORMALITY OCCURS signaling, in_communication, after_communication ETC.
    ...ETC.
}
```

FIG. 12B

```
//COMMUNICATION SERVICE QUALITY DATA (PERIODICAL TRANSMISSION)
// [EXAMPLE] category is communication.service_quality
"body" : {
    "comm_id" : "X-X-X-X" , //COMMUNICATION SERVICE ID (ID UNIQUE FOR EACH COMMUNICATION CONNECTION)
    "actual_send_audio_bw":"XXX" , //ACTUAL VALUE OF COMMUNICATION BAND USED FOR AUDIO TRANSMISSION
    "actual_recv_audio_bw":"XXX" , //ACTUAL VALUE OF COMMUNICATION BAND USED FOR AUDIO RECEPTION
    "avail_send_audio_bw":"XXX" , //VALUE OF AVAILABLE COMMUNICATION BAND FOR AUDIO TRANSMISSION
    "avail_recv_audio_bw":"XXX" , //VALUE OF AVAILABLE COMMUNICATION BAND FOR AUDIO RECEPTION
    //···ETC. AND VALUES OF AVAILABLE BAND AND ACTUAL BAND PREPARED FOR EACH TYPE OF DATA TO BE
    //TRANSMITTED AND RECEIVED, SUCH AS VIDEO DATA OR SCREEN DATA
    "rtt":"XX" , //ROUND TRIP TIME BETWEEN COMMUNICATION TERMINAL AND DESTINATION TERMINAL
    "rssi" : "-XX" , //RECEIVED SIGNAL STRENGTH INDICATION IF COMMUNICATION LINE IS WIRELESS LAN, FOR EXAMPLE.
    ETC.
}
```

FIG. 13A

```
// QUESTIONNAIRE (COMMUNICATION SERVICE QUALITY) DATA  USER QUESTIONNAIRE AFTER END OF COMMUNICATION
// [EXAMPLE] category is questionnaire.comm_quality
"body" : {
    "comm_id" : "X-X-X-X" ,     //COMMUNICATION SERVICE ID (ID UNIQUE FOR EACH COMMUNICATION CONNECTION)
    "answer" : {
        "comm_quality_q0001-01":"5",   //USER EVALUATION VALUE REGARDING COMMUNICATION QUALITY IN FIVE GRADES, FOR EXAMPLE,
        "comm_quality_q0002-01":"0",   //PROBLEM WITH VIDEO
        "comm_quality_q0002-02":"1",   //PROBLEM WITH AUDIO
        "comm_quality_q0002-03":"0",   //PROBLEM WITH XX
        "comm_quality_q0003-01":"SOUND WAS INTERRUPTED FROM WHEN FIVE MINUTES PASSED FROM START OF COMMUNICATION BETWEEN TERMINALS aa, bb, AND cc"
        ...ETC.
    }
}
```

FIG. 13B

```
//TERMINAL USE DEVICE INFORMATION, SETTING DATA AT TIME OF START OF COMMUNICATION OR AT TIME OF CHANGE
// [EXAMPLE] category is communication.setting
"body" : {
    "comm_id" : "X-X-X-X", // COMMUNICATION SERVICE ID (ID UNIQUE FOR EACH COMMUNICATION CONNECTION)
    "cpu_info" : "Xxxx Xxxx iX-XXXX CPU",
    "speaker_name" : "Xxxxxxxx USB Headset XX340",
    "mic_name" : "Xxxxxxxx USB Headset XX340",
    "camera_name" : "Xxxxxxxx HD Webcamera XX920",
         //···ETC. USE DEVICE INFORMATION (INTERNALLY/EXTERNALLY CONNECTED DEVICE)
    "speaker_volume" : "50",
    "mic_volume" : "50",
            "speaker_mute" : "unmute",
            "mic_mute" : "unmute",
            "camera_mute" : "unmute",
            "auto_xx_control" : "enable",
            "yy_setting" : "disable",
    "xx_comm_mode" : "xxxx_xxxx",
    //···ETC. SETTING INFORMATION
    ···ETC.
}
```

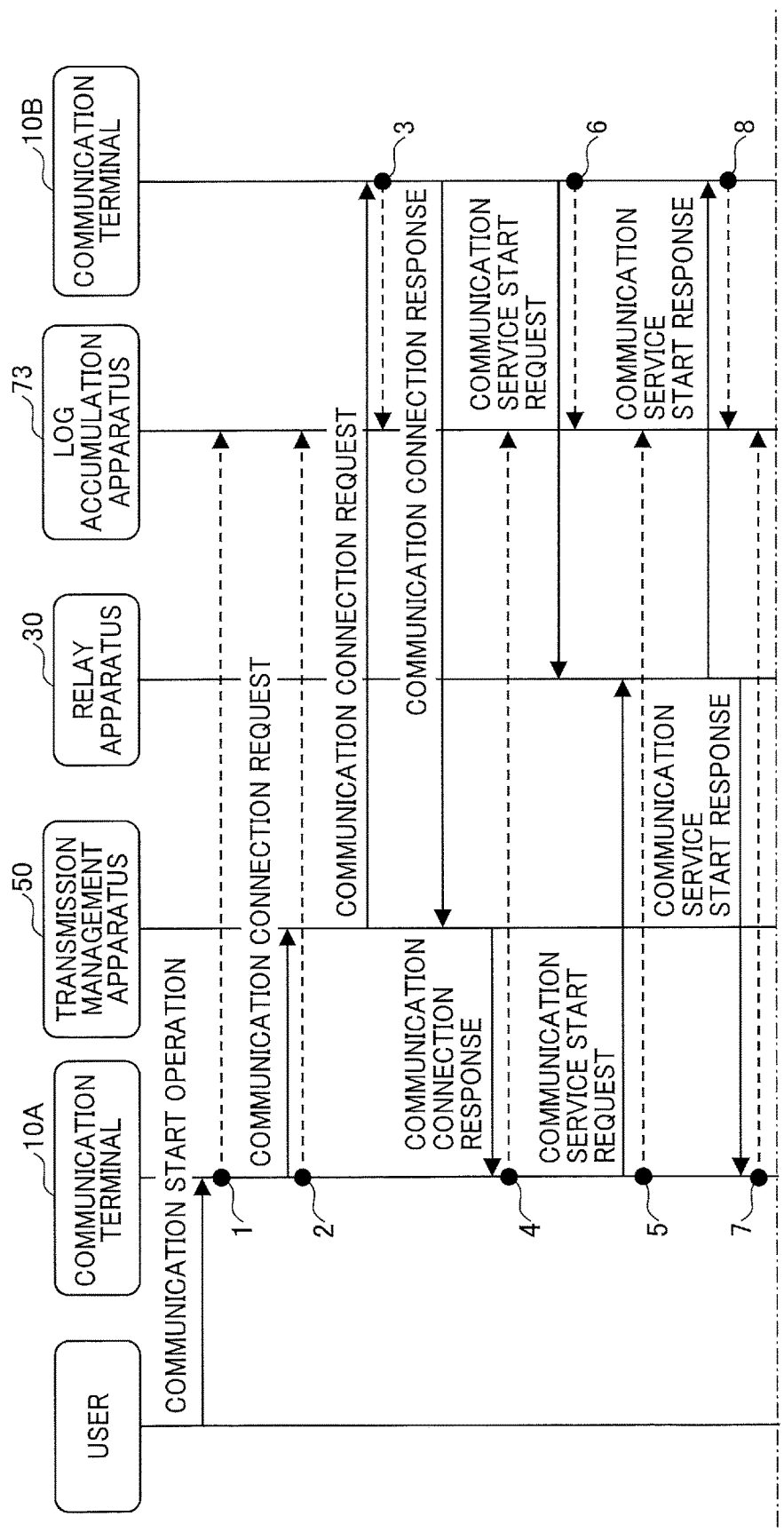

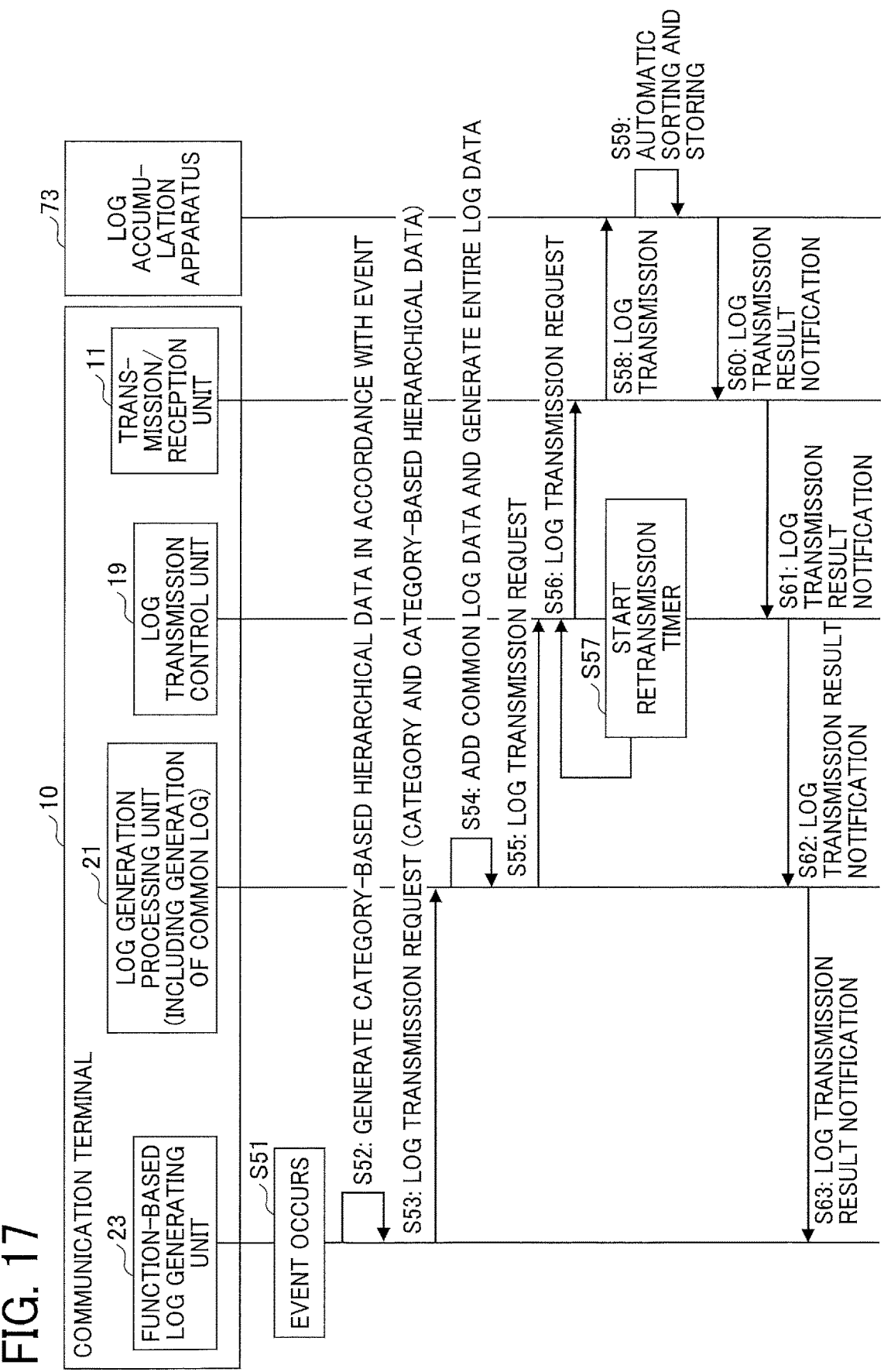

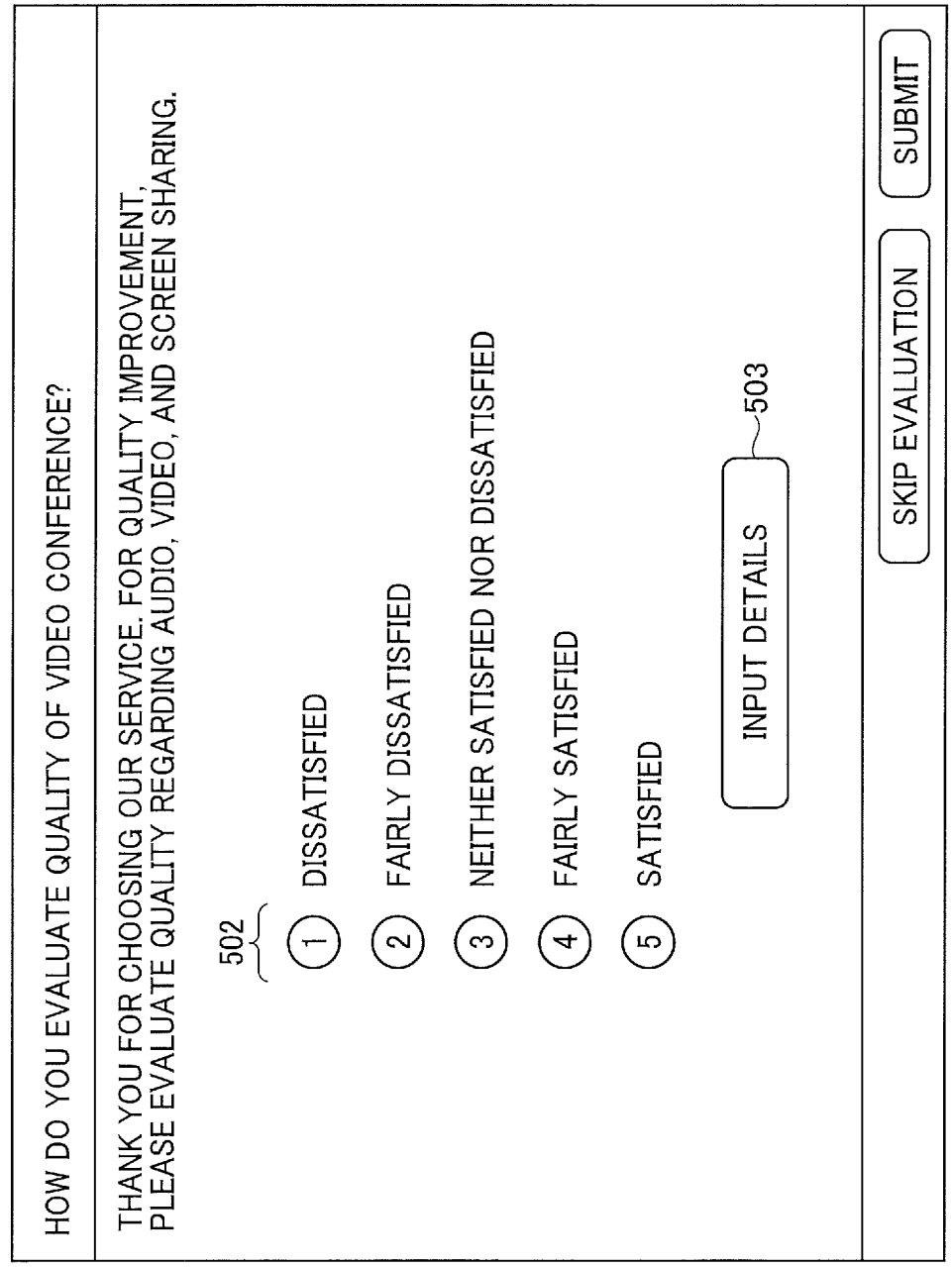

FIG. 22B

INPUT DETAILS  ⌐511

512 {
- ☐ PROBLEM WITH VIDEO
- ☐ PROBLEM WITH AUDIO
- ☐ PROBLEM WITH DOCUMENT SHARING
- ☐ PROBLEM AT TIME OF CONNECTION
- ☐ OTHER

∗ MULTIPLE CHOICE ALLOWED

SPECIFIC DETAILS OF PROBLEM OR SITUATION IN WHICH PROBLEM OCCURS —513

[ CANCEL ]  [ SUBMIT ]

COMMUNICATION TERMINAL, COMMUNICATION SYSTEM, LOG DATA TRANSMISSION METHOD, AND NON-TRANSITORY COMPUTER-READABLE MEDIUM

CROSS-REFERENCE TO RELATED APPLICATION

This patent application is based on and claims priority pursuant to 35 U.S.C. § 119(a) to Japanese Patent Application No. 2018-156661, filed on Aug. 23, 2018, in the Japan Patent Office, the entire disclosure of which is hereby incorporated by reference herein.

BACKGROUND

Technical Field

The present disclosure relates to a communication terminal, a communication system, a log data transmission method, and a non-transitory computer-readable medium.

Description of the Related Art

A communication system that shares video data, audio data, document data, and the like among multiple base locations in real time is known and is used for telecommunication such as a video conference system or a web conference system. In addition, the communication system is also used for data distribution system that distributes video or the like in one direction.

While the communication system provides a communication service, a communication terminal records log data for the purpose of improving the quality of the communication service. When a user feels a certain defect during the communication service and makes an inquiry to a call center, the user operates the communication terminal in accordance with an instruction from the call center and transmits the log data to a log accumulation apparatus. Alternatively, after the communication has ended, the communication terminal automatically (even if no user operation is performed) transmits the log data to the log accumulation apparatus.

An administrator or the like of the communication system analyzes the log data that is downloaded from the log accumulation apparatus so as to use the analysis result for identifying the cause of a communication failure, for example.

SUMMARY

Embodiments of the present disclosure describe a communication terminal that receives at least one of image data and audio data from at least one other terminal via a network, the communication terminal including circuitry to generate log data in response to occurrence of an event at the communication terminal, and transmit the generated log data to an accumulation apparatus each time the event occurs.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 6A and 6B are a block diagram illustrating an example of a functional configuration of the log collection/analysis system;

FIGS. 7A and 7B each illustrate a data format of an example of log data having a structure;

FIGS. 8A and 8B each illustrate an example of a log data structure obtained by converting nested-structure log data into one-layer log data;

FIG. 9 illustrates an example of common data in the log data;

FIGS. 10A and 10B illustrate examples of category-based hierarchical data of a communication connection request and a communication connection response;

FIGS. 11A and 11B illustrate examples of the category-based hierarchical data of the start of a communication service and the end of communication;

FIGS. 12A and 12B illustrate examples of the category-based hierarchical data of abnormal end of communication and periodical transmission;

FIGS. 13A and 13B illustrate examples of the category-based hierarchical data to be transmitted as an answer to a questionnaire and terminal use device information;

FIGS. 16A and 16B illustrate examples of events for which the communication terminal transmits log data and log data transmitted in response to each event;

FIG. 17 is a sequence diagram illustrating an example of a process in which the communication terminal generates and transmits log data;

FIGS. 22A and 22B illustrate examples of questionnaire screens that the communication terminal displays on a display.

Figure 1:
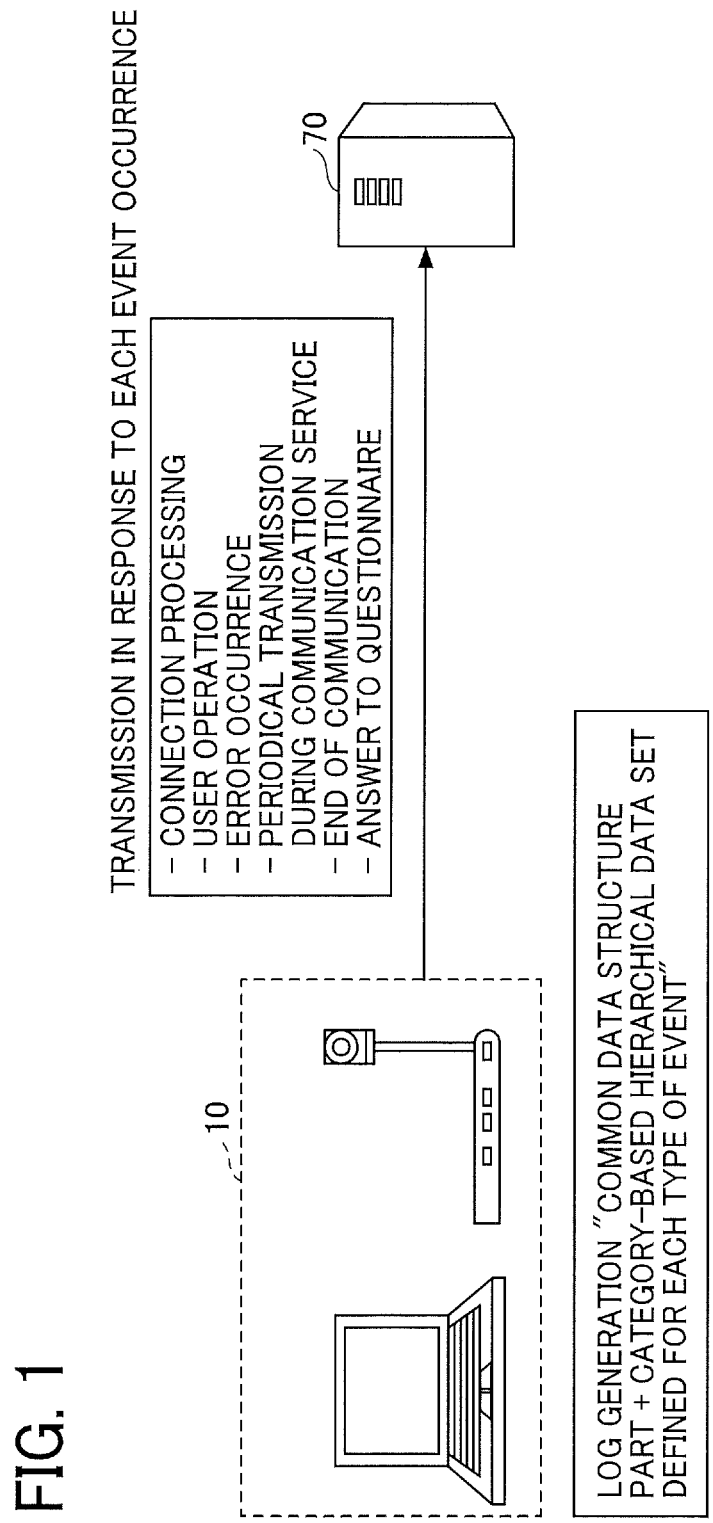
FIG. 1 illustrates examples of triggers for transmitting log data from a communication terminal.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Now, as an exemplary embodiment of the present disclosure, a communication terminal and a log data transmission method performed by the communication terminal will be described with reference to the drawings.

Outline of Operations Related to Transmission of Log Data

FIG. 1 illustrates examples of log data and triggers for transmitting the log data. The log data is transmitted by a communication terminal 10 according to this embodiment. The communication terminal 10 can communicate with a log collection/analysis system 70 via a network. The communication terminal 10 transmits the log data in response to each event that has occurred in the communication terminal 10, as will be described below in detail.

(1) The communication terminal 10 generates log data in a predetermined format. The log data includes common data that is common to all the log data and category-based hierarchical data (example of event-based data) that is defined for each type of event. The event is a certain event (an affair or an incident that appears in an observable form) that can occur in the communication terminal 10. The event is a predefined event that provides log data useful for improving the quality of a communication service.

(2) In response to detection of the event, the communication terminal 10 generates the log data in a predetermined format and transmits the generated log data to a log accumulation apparatus 73. For example, the transmission occurs in response to any of the following events.

connection processing (including start of communication)
user operation
occurrence of an error (e.g., a communication error)
periodical transmission during communication
end of communication
answer to a questionnaire In the above manner, the communication terminal 10 does not accumulate the log data, but the communication terminal 10 can transmit the log data in response to each event occurrence even during the communication service.

The log data has been transmitted during the communication service even if the communication service is abnormally ended as a result of disconnection of the communication session. This prevents a failure of transmission of all the log data accumulated in the communication terminal 10 during the communication service.

After the communication service has ended, the log data accumulated in the communication terminal 10 is collectively transmitted in a method. In this method, the user often turns off the communication terminal 10 immediately after the communication service has ended. Thus, there is no time for transmitting the log data. This results in a failure of transmission of the log data (no log data has been collected in some cases). However, such a failure is prevented in this embodiment.

Since the log data is transmitted periodically during the communication service, the log collection/analysis system 70 can collect the log data during the communication service, and an administrator of the communication system can investigate a communication failure or the like that occurs during the communication service in real time and can check against the communication failure occurrence situation to perform analysis concurrently with the communication service. Therefore, timely analysis can be performed at the time of occurrence of abnormality.

In addition, in the related art, the log data is generated in a different format or according to a different rule for each function (e.g., connection processing, transmission/reception of content data, cooperation with an electronic whiteboard, or error management) of the communication terminal 10, and a set of log data items of the functions is collectively transmitted at a time. Thus, after the log data items have been collected in the log collection/analysis system 70, it has been difficult for the administrator or the like of the communication system or the log collection/analysis system 70 to extract the log data of a given function by a predetermined specification method or to analyze log data items of different functions in association with each other.

In contrast, the log data in this embodiment is stored in a predetermined format, which is common data and category-based hierarchical data that is defined for each type of event. Thus, the log data has the same structure even if the function differs. Accordingly, it is possible to extract the log data of a given function by a predetermined specification method or to analyze log data items of different functions in association with each other.

Terminology

The log data is data of record regarding the execution or a failure of the execution of certain processing by an information processing apparatus. Details of the log data may differ according to event. For example, the log data may be any information that can be acquired from the communication terminal, such as the date and time of an operation or data transmission/reception, details of an event, or in what kind of environment the event has occurred.

"To transmit log data in response to each event occurrence" means that, in response to occurrence of an event, before the following event occurs, log data regarding the event that has occurred is generated and the generated log data is immediately transmitted. After the log data has been generated, the log data may be transmitted after a certain period of time. However, the log data is preferably transmitted immediately after being generated and before the following event occurs. Note that no problem is posed if the following event occurs before the log data is transmitted. In a case where a plurality of log data items are generated in a short period of time, the following event occurs before the log data items are transmitted. In this case, the log data items may be generated one by one or concurrently. In addition, the log data items may be generated and transmitted concurrently.

System Configuration Example

Figure 2:
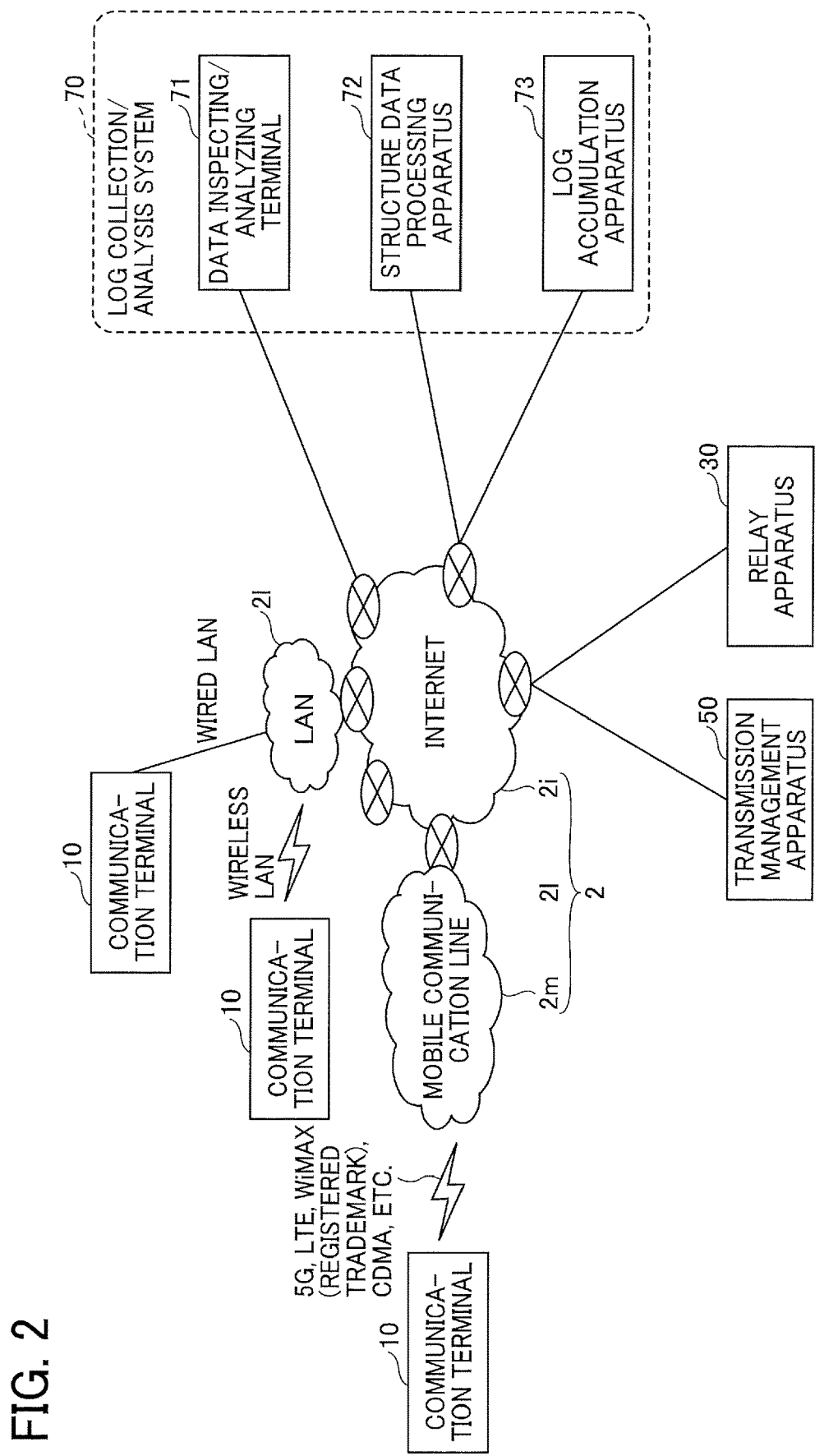
FIG. 2 illustrates an example of a schematic configuration of a communication system.

FIG. 2 illustrates an example of a schematic configuration of a communication system 1. As illustrated in FIG. 2, the communication system 1 includes a plurality of communication terminals 10, a transmission management apparatus 50, a relay apparatus 30, and the log collection/analysis system 70. The communication terminals 10, the transmission management apparatus 50, the relay apparatus 30, and the log collection/analysis system 70 can communicate via a network.

The communication terminals 10, the transmission management apparatus 50, the relay apparatus 30, and the log collection/analysis system 70 are connected via an internet 2i, a local area network (LAN) 21, and a mobile communication line 2m so that communication can be performed therebetween. One or more of the internet 2i, the LAN 21, and the mobile communication line 2m will be simply referred to as a communication network 2.

The LAN 21 includes not only a wired LAN but also a wireless LAN. Examples of the mobile communication line 2m include communication schemes such as 5G, Long Term Evolution (LTE), Worldwide Interoperability for Microwave Access (WiMAX), and Code Division Multiple Access (CDMA). Communication via the internet 2i is optional, and communication may be performed within the LAN 21. In addition, the mobile communication line 2m is not used in some cases.

One of the communication terminals 10 establishes a communication session with one or more of the other communication terminals 10 via the transmission management apparatus 50 and transmits and receives at least one of image data, audio data, and document data (hereinafter referred to as content data) via the relay apparatus 30 specified by the transmission management apparatus 50. The image data may include either a still image or a moving image.

In addition, the communication terminal 10 transmits log data to the log accumulation apparatus 73 of the log collection/analysis system 70. The log data is generated in accordance with an event and is transmitted to the log accumulation apparatus 73 in real time. Details of the log data will be described later.

The log data is generated and transmitted when, for example, any of the following events occurs.

- Upon an operation for starting communication (reception of selection of a destination communication terminal 10), the log data regarding details of the operation is generated and transmitted.
- Upon a communication connection request (a communication terminal 10 designates the destination communication terminal 10 to request the start of communication), the log data regarding details of the processing is generated and transmitted.
- Upon a communication connection response (a response indicating that the relay apparatus or the like is determined and that communication can be started), the log data regarding details of the processing is generated and transmitted.
- Upon a communication service start request and a communication service start response (when the relay apparatus establishes a communication session), the log data regarding the terminal and a communication environment, such as information of a network line to which the communication terminal 10 is to be connected and terminal setting/device information, is generated and transmitted.
- During the communication service (during transmission/reception of content data), the log data regarding the terminal and the communication environment, such as information of the network line and terminal setting/device information, is generated and transmitted.
- Upon a user operation, the log data regarding details of the operation or processing is generated and transmitted.
- Upon occurrence of an error, the log data regarding details of the error (see FIG. 21 for details of the error) or the status at the time of occurrence of the error is generated and transmitted.
- Upon a communication end request (a request for disconnecting the communication service), the log data regarding details of the processing is generated and transmitted.
- Upon a communication end response (a response to the communication end request), the log data regarding details of the processing is generated and transmitted.
- Upon a communication service end response (a notification of ending of the communication service), the log data regarding details of the processing is generated and transmitted.
- Upon an answer to a questionnaire, details of the answer are transmitted as the log data.
- During the communication service, the log data regarding the communication quality at that time is periodically generated and transmitted.

Although the log data is transmitted toward the log accumulation apparatus 73 via the communication network 2, if the log data is not delivered (in a case of timeout), the communication terminal 10 performs retransmission. The number of times of transmission as the retransmission has a predetermined upper limit as the maximum number. In addition, after the communication service has ended, the communication terminal 10 makes a questionnaire regarding the quality of the communication service and transmits, to the log collection/analysis system 70, the level of satisfaction regarding the communication service and the communication quality that a user felt.

The communication terminal 10 may be a terminal dedicated to the communication system 1 or a general-purpose terminal. The general-purpose terminal is, for example, a personal computer (PC), a smartphone, a tablet terminal, or the like, and operates as the communication terminal 10 by the communication system 1 executing dedicated application software.

In addition, in a case where the communication terminal 10 is the general-purpose terminal, the general-purpose terminal enables telecommunication by the communication system 1 executing dedicated application software or enables telecommunication by executing general-purpose browser software. Processing of the log data in this embodiment is applicable to both the dedicated application software and the general-purpose browser software.

The transmission management apparatus 50 is one or more computers that manage the entirety of the communication system 1 according to this embodiment. The transmission management apparatus 50 is a server and thus has functions of an information processing apparatus. The transmission management apparatus 50 serves as a call control server that manages the status of the communication terminals 10 and performs call control so as to start a session between two or more of the communication terminals 10 in a case of calling. The call control is a process regarding connection, such as receiving a call for starting communication and causing a partner to receive an incoming call, receiving a response to the incoming call from the partner, and disconnecting, in response to disconnection of communication from either one of the communication terminals 10, communication from the other of the communication terminals 10. Besides, the transmission management apparatus 50 also authenticates the communication terminals 10, searches for the communication terminals 10, performs alive monitoring, and the like in many cases. Furthermore, the transmission management apparatus 50 also manages a database for controlling the communication system 1, such as a database of a destination list of the communication terminals 10. The determination list is data in which the communication terminals 10 (or users) as destinations are registered. Each of the communication terminals 10 can transmit a request for starting telecommunication (can make a phone call) to the destinations.

Note that the status is the status of the communication terminals 10 in the communication system 1. The status is mainly classified into a status where an incoming call is acceptable (online), a status where an incoming call is unacceptable (offline), and a status during transmission. Furthermore, the transmission management apparatus 50 manages the status of the relay apparatus 30, selects the relay apparatus 30 to be used for telecommunication, manages login of users who use the communication terminals 10, manages a data session established between the plurality of communication terminals 10, and the like.

The relay apparatus 30 is a computer that relays content data from one communication terminal 10 to another or other communication terminals 10 among the plurality of communication terminals 10 that perform telecommunication. The relay apparatus 30 has functions of an information processing apparatus. The relay apparatus 30 monitors the band for communication with the communication terminals 10 and transmits image data with quality suitable for the band (high quality, intermediate quality, or low quality). Although the single relay apparatus 30 is illustrated in FIG. 2, a plurality of relay apparatuses 30 are used in many cases.

The log collection/analysis system 70 is one or more computers that collect and analyze the log data. The log collection/analysis system 70 has functions of an information processing apparatus. The log collection/analysis system 70 includes a data inspecting/analyzing terminal 71, a structure data processing apparatus 72, and the log accumulation apparatus 73. Details of these will be described later. The log data is analyzed in response to the administrator's operation on the data inspecting/analyzing terminal 71 or is automatically analyzed by the structure data processing apparatus 72.

The structure data processing apparatus 72 and the log accumulation apparatus 73 may be present as one apparatus, not the separate apparatuses as illustrated.

In addition, the structure data processing apparatus 72 and the log accumulation apparatus 73 can support cloud computing. The "cloud computing" refers to internet-based computing where resources on a network are used or accessed without identifying specific hardware resources.

Hardware Configuration Examples

Next, hardware configurations of the communication terminal 10, the log collection/analysis system 70, the transmission management apparatus 50, and the relay apparatus 30 will be described.

Communication Terminal

Figure 3:
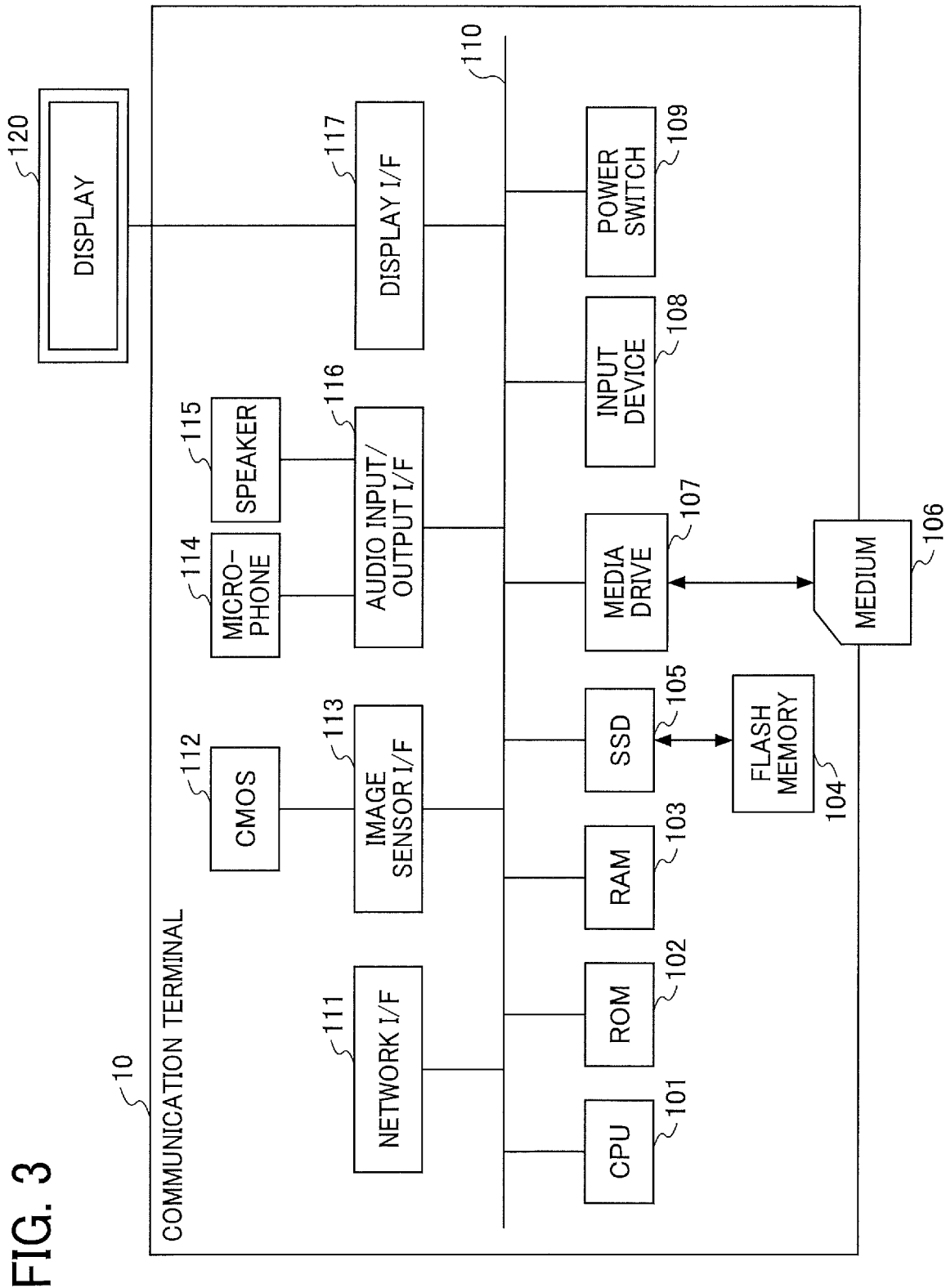
FIG. 3 is a block diagram illustrating an example of a hardware configuration of the communication terminal.

FIG. 3 is a block diagram illustrating an example of the hardware configuration of each of the communication terminals 10 according to the embodiment of the present disclosure. As illustrated in FIG. 3, the communication terminal 10 according to this embodiment includes a central processing unit (CPU) 101, a read only memory (ROM) 102, a random access memory (RAM) 103, a flash memory 104, a solid-state drive (SSD) 105, a media drive 107, an input device 108, a power switch 109, a network interface (I/F) 111, a complementary metal oxide semiconductor (CMOS) 112, an image sensor I/F 113, a microphone 114, a speaker 115, an audio input/output I/F 116, a display I/F 117, and a bus line 110. The CPU 101 controls general operations of the communication terminal 10. The ROM 102 stores a program for the communication terminal 10. The RAM 103 is used as a work area of the CPU 101. The flash memory 104 stores various kinds of data such as image data and audio data. The SSD 105 controls reading or writing of various kinds of data from/to the flash memory 104 under control of the CPU 101. The media drive 107 controls reading or writing (storing) of data from/to a recording medium 106 such as a flash memory. The input device 108 is operated when the destination of the communication terminal 10 is selected, for example. The power switch 109 is a switch for switching on and off the power of the communication terminal 10. The network I/F 111 is an interface used for data transmission by using the communication network 2, which will be described later. The CMOS 112 captures an image of a subject under control of the CPU 101 and obtains image data. The image sensor I/F 113 controls driving of the CMOS 112. The microphone 114 receives audio. The speaker 115 outputs audio. The audio input/output I/F 116 inputs or outputs an audio signal between the microphone 114 and the speaker 115 under control of the CPU 101. The display I/F 117 transmits image data to an externally attached display 120 under control of the CPU 101. The bus line 110 is, for example, an address bus, a data bus, or the like, and electrically connects the above components as illustrated in FIG. 3.

Note that the input device 108 is one or more operation buttons, a touch panel, or the like in a case where the communication terminal 10 is a dedicated terminal. The input device 108 is a keyboard in a case where the communication terminal 10 is a general-purpose terminal such as a PC or a touch panel in a case where the communication terminal 10 is a general-purpose terminal such as a smartphone, a tablet device, or a personal digital assistant (PDA).

The recording medium 106 is attachable to and detachable from the communication terminal 10. In addition, any non-volatile memory that reads or writes data under control of the CPU 101, such as an electrically erasable and programmable ROM (EEPROM) may be used in addition to the flash memory 104. Furthermore, the CMOS 112 is a solid-state image sensor that converts light to electric charge and digitizes a subject's image (video). As long as an image of the subject is captured, not only the CMOS, but also a charge coupled device (CCD) or the like may be used. In addition, the display 120 is formed of a liquid crystal display or an organic electroluminescent (EL) display that displays the subject's image, an operation icon, and the like.

The program for the communication terminal 10 is a file in an installable or executable format and may be circulated by being recorded on a computer-readable recording medium such as the above recording medium 106.

Hardware Configuration Example of Log Collection/Analysis System

Figure 4:
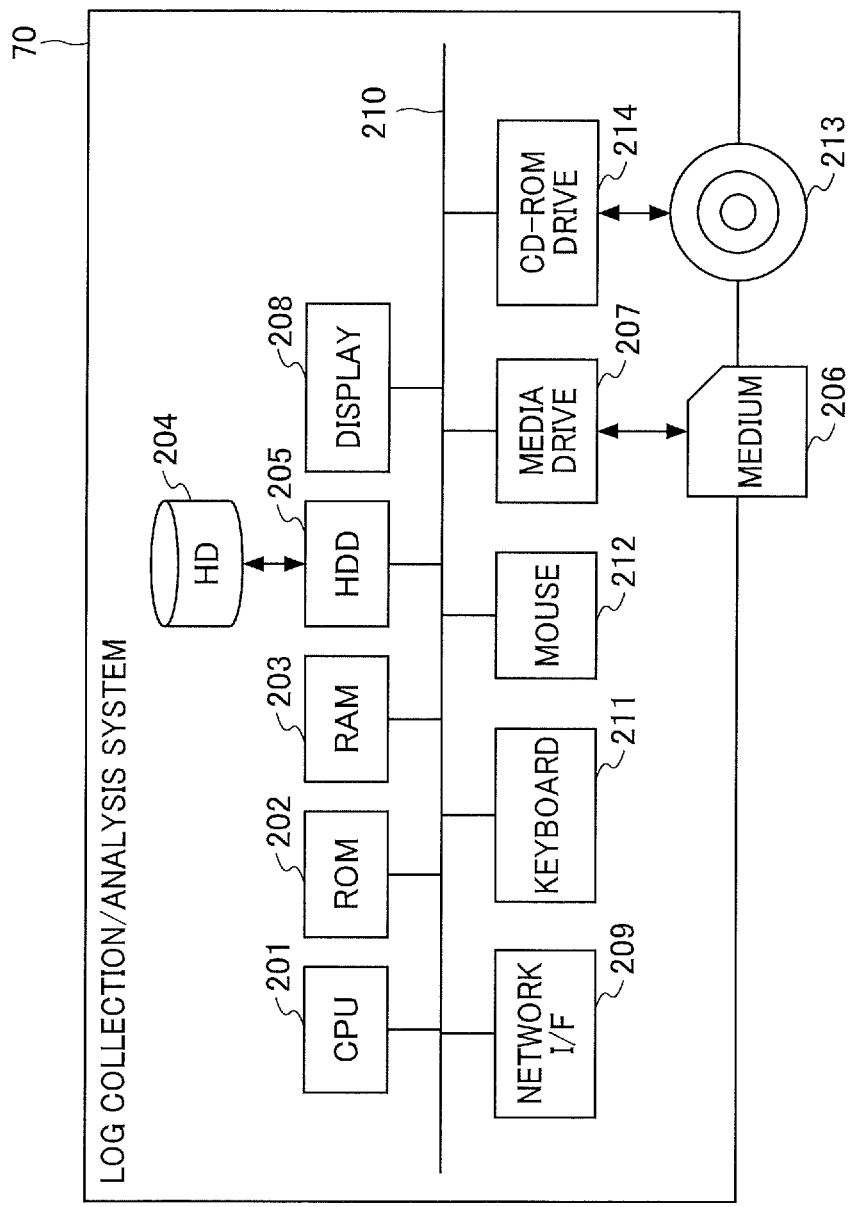
FIG. 4 is a block diagram illustrating an example of a hardware configuration of a log collection/analysis system.

FIG. 4 is a block diagram illustrating an example of the hardware configuration of the data inspecting/analyzing terminal 71, the structure data processing apparatus 72, and the log accumulation apparatus 73 included in the log collection/analysis system 70. The log collection/analysis system 70 includes a CPU 201, a ROM 202, a RAM 203, a hard disk (HD) 204, a hard disk drive (HDD) 205, a media drive 207, a display 208, a network I/F 209, a keyboard 211, a mouse 212, a compact disc read only memory (CD-ROM) drive 214, and a bus line 210. The CPU 201 controls general operations of the log collection/analysis system 70. The RAM 203 is used as a work area of the CPU 201. The HD 204 stores various kinds of data and programs of the data inspecting/analyzing terminal 71, the structure data processing apparatus 72, and the log accumulation apparatus 73. The HDD 205 controls reading or writing of various kinds of data from/to the HD 204 under control of the CPU 201. The media drive 207 controls reading or writing (storing) of data from/to a recording medium 206 such as a flash memory. The display 208 displays various kinds of information such as a cursor, a menu, a window, a text, or an image. The network I/F 209 is an interface for data transmission by using the communication network 2, which will be described later. The keyboard 211 includes a plurality of keys for inputting characters, numerical values, various instructions, and the like. The mouse 212 is used for selecting or executing various instructions, selecting a processing target, moving a cursor, and the like. The CD-ROM drive 214 controls reading or writing of data from/to a CD-ROM 213, as an example of an attachable/detachable recording medium. The bus line 210 is, for example, an address bus or a data bus and electrically connects the above components as illustrated in FIG. 4.

Note that the keyboard 211 and the mouse 212 may be connected as appropriate and may not be connected to the log collection/analysis system 70 in a normal state.

The programs for the data inspecting/analyzing terminal 71, the structure data processing apparatus 72, and the log accumulation apparatus 73 are each a file in an installable or executable format and may be circulated by being recorded on a computer-readable recording medium such as the above recording medium 206 or the CD-ROM 213.

Note that the hardware configuration diagram of the transmission management apparatus 50 and that of the relay apparatus 30 are substantially the same as that in FIG. 4, but may be different, in which case the description of this embodiment is not impaired.

Functions

Figure 5A:
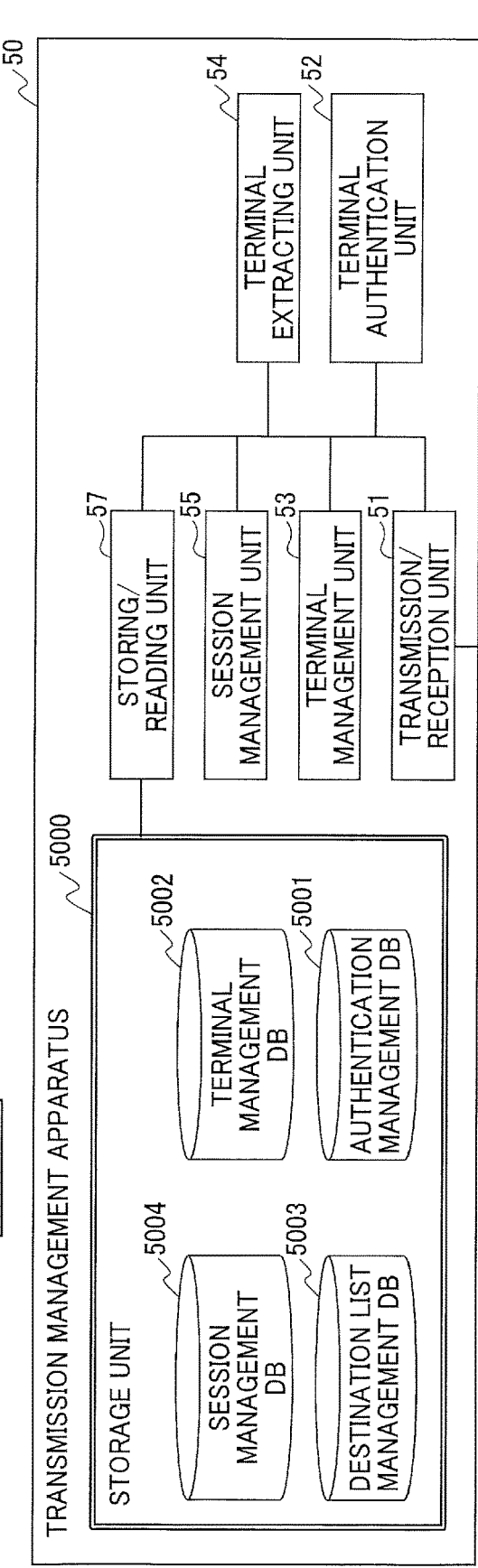
FIGS. 5A and 5B are a block diagram illustrating an example of a functional configuration of a transmission management apparatus and an example of a functional configuration of the communication terminal included in the communication system.
Figure 5B:
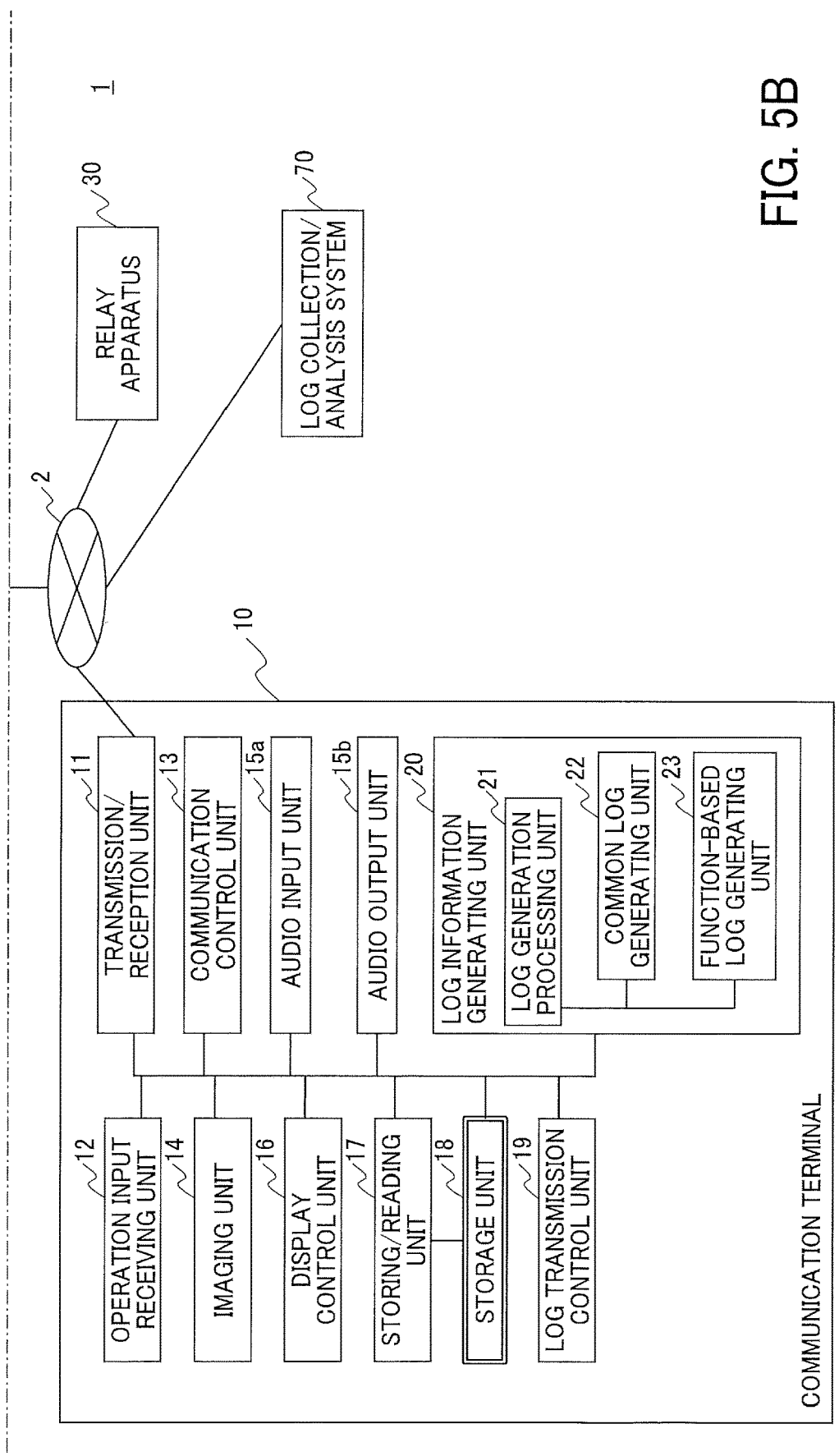

Next, functions of the communication system 1 will be described with reference to FIG. 5A and FIG. 5B. FIG. 5A and FIG. 5B are a block diagram illustrating an example of the functional configuration of the transmission management apparatus 50 and an example of the functional configuration of the communication terminal 10. The transmission management apparatus 50 and the communication terminal 10 are included in the communication system 1. Note that functions of the relay apparatus 30 will be described as appropriate.

Functional Configuration of Communication Terminal

The communication terminal 10 includes a transmission/reception unit 11, an operation input receiving unit 12, a communication control unit 13, an imaging unit 14, an audio input unit 15a, an audio output unit 15b, a display control unit 16, a storing/reading unit 17, a log transmission control unit 19, and a log information generating unit 20. Each of these units is a function or means realized by any of the components illustrated in FIG. 3 operating in response to a command from the CPU 101 in accordance with the program for the communication terminal 10 loaded from the flash memory 104 to the RAM 103. In addition, the communication terminal 10 includes a storage unit 18 realized by the RAM 103 illustrated in FIG. 3 and the flash memory 104 illustrated in FIG. 3.

The transmission/reception unit 11 transmits and receives various kinds of data (or information) to/from another or other communication terminals 10, an apparatuses, or a system via the communication network 2. Prior to start of a call with a desired destination terminal, the transmission/reception unit 11 starts to receive each piece of status information indicating the status of each of the communication terminals 10 as candidate destinations from the transmission management apparatus 50. Note that the status information indicates not only the working status of each of the communication terminals 10 (online status or offline status), but also, in a case of the online status, a detailed status as to whether a call can be made, whether a call is being made, or the like.

The operation input receiving unit 12 receives inputs of various kinds of information from an operator to the communication terminal 10. For example, when the operator performs an operation for turning on the power of the communication terminal 10, the operation input receiving unit 12 receives the operation and controls the power to be turned on. The operation input receiving unit 12 also receives various operations including inputs of information to the communication terminal 10.

For example, in response to reception of the above turning on of the power, the communication control unit 13 automatically transmits login request information indicating a request of login and an IP address of a requesting terminal at the current time from the transmission/reception unit 11 to the transmission management apparatus 50 via the communication network 2. In a case where the communication terminal 10 is a general-purpose terminal, the trigger may be the start of application software or browser software or a user's login operation to the application software or browser software. In addition, in response to an operator's operation for turning off the power of the communication terminal 10, after the transmission/reception unit 11 has transmitted the status information for turning off the power to the transmission management apparatus 50, the communication terminal 10 turns off the power. Thus, the transmission management apparatus 50 can acquire the information indicating that the communication terminal 10 is brought into the off-state from the on-state. In a case where the communication terminal 10 is a general-purpose terminal, the trigger may be the end of the application software or browser software or a user's logoff operation of the application software or browser software.

In addition, the communication control unit 13 performs various communication controls such as establishment and disconnection of a session for transmitting and receiving content data to/from another or other communication terminals 10 via the relay apparatus 30. Note that the communication control unit 13 according to this embodiment transmits a communication identifier (ID) of the communication terminal 10 together with data transmitted to the transmission management apparatus 50.

The communication ID is an example of identification information of an account that can participate in a session for transmitting and receiving content data by using the communication terminal 10. Examples of the communication ID include a user ID that is the identification information of the operator, an application ID that is the identification information of an application, a contract ID that is the identification information of a contractor of the communication terminal 10, and the like. In addition, the communication ID is information in which at least two of a character, a numerical value, a symbol, and any of various signs are combined. The communication ID may alternatively be an email address or the like.

The imaging unit 14 converts captured-image data obtained by capturing an image of a subject into predetermined image data and outputs the image data. The communication terminal 10 may include a plurality of imaging units 14.

The microphone 114 converts the voice of the operator into an audio signal, and then the audio input unit 15a converts the audio signal into predetermined audio data and outputs the audio data. The audio output unit 15b converts the audio data into an audio signal and outputs the audio signal to the speaker 115, and the speaker 115 outputs the audio.

The display control unit 16 causes, for example, the display 120 to display image data included in the content data that has been received by the communication terminal 10. In addition, the display control unit 16 can also cause the display 120 to display information of the destination list received from the transmission management apparatus 50.

The log information generating unit 20 performs processing for generating log data. The log information generating unit 20 includes a log generation processing unit 21, a common log generating unit 22, and a function-based log generating unit 23.

The log generation processing unit 21 acquires common log data from the common log generating unit 22 and acquires category-based hierarchical data from the function-based log generating unit 23 to store both the common log data and the category-based hierarchical data in a predetermined format and complete the log data. The log information generating unit 20 generates the log data in the JSON format, the XML format, or the CSV format, for example.

The common log generating unit 22 generates the common log data that is given to all the log data in common. The common log data includes a log ID, time, a model type, a software version, a communication service ID, a user ID, and the like.

In a case where an event has occurred in any of the functions of the communication terminal 10, such as the operation input receiving unit 12 and the communication control unit 13, the function-based log generating unit 23 receives a notification of occurrence of the event from the corresponding function of the communication terminal 10 and generates the category-based hierarchical data in accordance with the event.

In response to each event occurrence (in response to each log data generation), the log transmission control unit 19 causes the transmission/reception unit 11 to transmit the log data generated by the log information generating unit 20 to the log collection/analysis system 70.

The storing/reading unit 17 stores various kinds of data in the storage unit 18 and reads various kinds of data stored in the storage unit 18.

The storage unit 18 stores, for example, authentication information such as the above-described communication ID and the password corresponding to the communication ID. Each time the image data and the audio data are received for a call with a destination terminal, the image data and the audio data stored in the storage unit 18 are overwritten. The image data before being overwritten is used for displaying an image on the display 120, and the audio data before being overwritten is used for outputting audio from the speaker 115.

Functional Configuration of Transmission Management Apparatus

The transmission management apparatus 50 includes a transmission/reception unit 51, a terminal authentication unit 52, a terminal management unit 53, a terminal extracting unit 54, a session management unit 55, a storing/reading unit 57, and the like. Each of these units is a function or means realized by any of the components illustrated in FIG. 4 operating in response to a command from the CPU 201 in accordance with the program for the transmission management apparatus 50 loaded from the HD 204 to the RAM 203. In addition, the transmission management apparatus 50 includes a storage unit 5000 realized by the HD 204 or the like illustrated in FIG. 4.

Each Function of Transmission Management Apparatus

Next, each function of the transmission management apparatus 50 will be described in detail. The transmission/reception unit 51 transmits and receives various kinds of data (or information) to/from the communication terminal 10, an apparatus, or a system via the communication network 2.

Login request information is received through the transmission/reception unit 51, and the terminal authentication unit 52 determines whether a combination of the communication ID and the password included in the login request information is included in an authentication management database (DB) 5001 so as to authenticate the communication terminal 10.

The terminal management unit 53 causes each communication ID to be stored in association with a destination name thereof, a working status thereof, a date and time of reception of request information or the like, and an IP address or the like of a requesting terminal in a terminal management DB 5002 for management. For example, in response to the operator bringing the communication terminal 10 to the off-state from the on-state, the communication terminal 10 transmits status information of the turning off of the power. On the basis of the status information, the terminal management unit 53 changes the working status in the terminal management DB 5002 from "online" to "offline".

By using, as a key, the communication ID of the requesting terminal that has requested login, the terminal extracting unit 54 searches a destination list management DB 5003 and extracts the communication IDs of destination terminals (candidate destination terminal) to which the requesting terminal can make a call. The terminal extracting unit 54 further searches the destination list management DB 5003 and extracts the communication IDs of other communication terminals 10 for which the communication ID of the above requesting terminal is registered as a candidate destination terminal.

Furthermore, by using, as a key, each of the extracted communication IDs of the candidate destination terminals, the terminal extracting unit 54 searches the above-described terminal management DB 5002 and reads the working status of each of the extracted communication IDs. Thus, the terminal management unit 53 can acquire the working status of each of the candidate destination terminals to which the requesting terminal that has requested login can make a call. In addition, by using the communication ID of the requesting terminal as a search key, the terminal management unit 53 searches the above-described terminal management DB 5002 to also acquire the working status of the requesting terminal that has requested login.

The session management unit 55 controls a session managed by the transmission management apparatus 50. The control of the session includes, for example, control for establishing the session, control for allowing the communication terminal 10 to participate in the established session, a control for disconnecting the session, generation of a session ID, and the like. In addition, the session management unit 55 causes the session ID that is the identification information of the session to be stored in a session management DB 5004 in association with the communication ID of the communication terminal 10 that has requested the start of the session, the communication ID of a destination terminal or communication IDs of destination terminals, and the like for management.

The storing/reading unit 57 is realized by a command from the CPU 201 or the HDD 205 illustrated in FIG. 4 or is realized by a command from the CPU 201. The storing/reading unit 57 stores various kinds of data in the storage unit 5000 and reads various kinds of data from the storage unit 5000.

Examples of Information Managed by Transmission Management Apparatus

Each of the management DBs stored in the storage unit 5000 of the transmission management apparatus 50 will be described.

TABLE 1

Authentication Management Table 602

| Communication ID | Password |
|---|---|
| 01aa | aaaa |
| 01bb | abab |
| 01cc | baba |

The authentication management DB 5001 stored in the storage unit 5000 of the transmission management apparatus 50 includes, for example, an authentication management table 602 illustrated in Table 1. In the authentication management table 602, the communication IDs of the communication terminals 10 managed by the transmission management apparatus 50 and the passwords corresponding to the communication IDs are associated with each other for management. For example, the authentication management table 602 illustrated in Table 1 indicates that the password of the communication terminal 10 with the communication ID "01aa" is "aaaa".

TABLE 2

Terminal Management Table 603

| Communication ID | Destination Name | Working Status | Reception Date and Time | IP Address of Terminal |
|---|---|---|---|---|
| 01aa | Japan, Home Office | Online (Communication is Possible) | 20xx. 4. 10 13:40 | 1.2.1.3 |
| 01bb | USA, First Laboratory | Online (Communication is Possible) | 20xx. 4. 10 13:40 | 1.2.1.4 |
| 01cc | USA, NY Directly Managed Store | Online (Communication is Possible) | 20xx. 4. 10 9:50 | 1.2.1.5 |
| 01dd | China, First Factory | Online (During Communication) | 20xx. 4. 10 11:42 | 1.2.1.5 |
| ... | ... | ... | ... | ... |

The terminal management DB 5002 stored in the storage unit 5000 of the transmission management apparatus 50 includes, for example, a terminal management table 603 illustrated in Table 2. In the terminal management table 603, each of the communication IDs of the communication terminals 10 is associated with a destination name that is set in a case where the communication terminal 10 is set as the destination, the working status of the communication terminal 10, the date and time at which login request information, which will be described later, was received by the transmission management apparatus 50, and an IP address of the communication terminal 10 for management. For example, the terminal management table 603 illustrated in Table 2 indicates that the communication terminal 10 with the communication ID "01aa" has the destination name "Japan, Home Office" and the working status "online (communication is possible)". In addition, it is also indicated that for the communication terminal 10 with the communication ID "01aa", the date and time at which of the login request information was received by the transmission management apparatus 50 is "20xx. 4. 10 13:40", and the IP address thereof is "1.2.1.3".

TABLE 3

Destination List Management Table 701

| Communication ID of Requesting Terminal | Communication ID of Candidate Destination Terminal |
|---|---|
| 01aa | 01bb, 01cc, 01dd |
| 01bb | 01aa |
| 01cc | 01aa |
| 01dd | 01aa |
| ... | ... |
| 01db | 01ab, 01ba, . . . , 01da, 01ca, 01cb, . . . , 01da |

The destination list management DB 5003 stored in the storage unit 5000 of the transmission management apparatus 50 includes, for example, a destination list management table 701 illustrated in Table 3. In the destination list management table 701, the communication IDs of requesting terminals that request the start of communication in a video conference (also refereed to as teleconference) are associated with all communication IDs of destination terminals that are registered as candidate destination terminals for management. For example, in the destination list management table 701 illustrated in Table 3, candidate destination terminals to which the requesting terminal with the communication ID "01aa" can request the start of communication are communication terminals 10 with the communication IDs "01bb", "01cc", and "01dd". The candidate destination terminals are added or deleted by the transmission management apparatus 50 to be updated in response to a request for addition or deletion from a given requesting terminal to the transmission management apparatus 50.

With such a configuration, the requesting terminal (e.g., "01aa") can start communication with only a candidate destination terminal (e.g., "01bb") that is registered in advance. The destination terminal (e.g., "01bb") cannot communicate with the requesting terminal (e.g., "01aa") unless the requesting terminal (e.g., "01aa") is registered in the destination list management table 701 as the destination terminal. Such a system is preferable in that unexpected communication between the communication terminals 10 can be prevented. However, it may be unnecessary to register the above information in the destination list management table 701, and the communication terminals 10 may freely communicate.

TABLE 4

Session Management Table 702

| Session ID | Relay Apparatus ID | Communication ID of Requesting Terminal | Communication ID of Destination Terminal | Session Participation Date and Time |
|---|---|---|---|---|
| se1 | 111a | 01aa | 01bb | 20xx. 4. 10 13:45:30 |
| | | | 01cc | 20xx. 4. 10 13:50:30 |
| se2 | 111a | 01ad | 01ca | 20xx. 4. 10 13:11:11 |
| ... | ... | ... | ... | ... |

The session management DB 5004 stored in the storage unit 5000 of the transmission management apparatus 50 includes, for example, a session management table 702 illustrated in Table 4. In the session management table 702, for each session ID that is the identification information of a session, a relay apparatus ID of the relay apparatus 30 to be used for relaying, the communication ID of a requesting terminal, the communication ID of a destination terminal, and information of, for example, the date and time of participation in the session are managed. For example, the session management table 702 illustrated in Table 4 indicates that the session with the session ID "se2" is performed between the requesting terminal with the communication ID "01ad" and the destination terminal with the communication ID "01ca". In addition, it is also indicated that the session with the session ID "se2" was started at "20xx. 4. 10 13:11:11" via the relay apparatus 30 with the relay apparatus ID "111b".

Log Collection/Analysis System

Figure 6B:
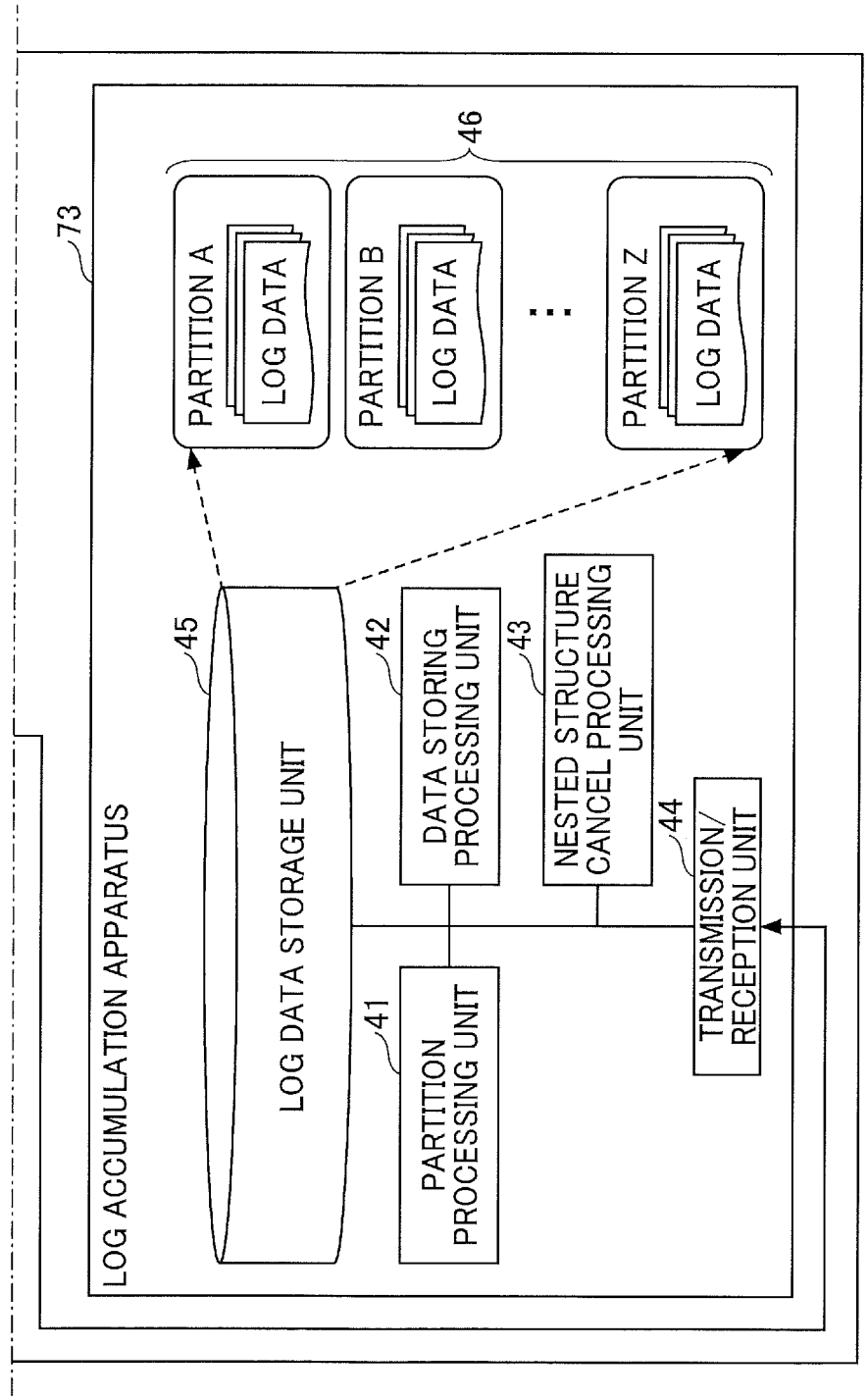

FIG. 6A and FIG. 6B are a block diagram illustrating an example of a functional configuration of the log collection/analysis system 70 in blocks.

Data Inspecting/Analyzing Terminal

The data inspecting/analyzing terminal 71 includes a structure data collecting unit 31, a table/graph generating unit 32, an operation receiving unit 33, a command processing unit 34, and a transmission/reception unit 35. Each of these units is a function or means realized by any of the components illustrated in FIG. 4 operating in response to a command from the CPU 201 in accordance with the program for the data inspecting/analyzing terminal 71 loaded from the HD 204 to the RAM 203. Note that browser software may be used as the program.

The transmission/reception unit 35 transmits a request for transmitting structure data, which will be described later, to the structure data processing apparatus 72, and receives the structure data from the structure data processing apparatus 72.

The operation receiving unit 33 receives various operations on the data inspecting/analyzing terminal 71. For example, the operation receiving unit 33 receives information regarding what kind of log data is to be acquired, information regarding how the acquired log data is to be collected, and the like.

The command processing unit 34 requests the structure data processing apparatus 72 to generate a structure data definition table. The structure data definition table is a table in which one or more search keys specified by a user are row headers or column headers. Thus, the structure data definition table is a container of log data. The log data is stored in the structure data definition table, and the structure data definition table storing the log data will be referred to as structure data. The search key is an item name for searching for the log data. For example, the item name is substantially the same as that for typical search conditions, such as a category name, date and time, user ID, or given character string (include or exclude the character string). For example, in a case where the structure data definition table in which the search key "date" is specified, the administrator or the like can perform search by further specifying a specific date in the structure data definition table. The list of the structure data definition table is displayed on the data inspecting/analyzing terminal 71. In this way, the structure data definition table is generated in advance, and thus, the working load of the administrator or the like can be reduced when analyzing the structure data.

The structure data collecting unit 31 collects the structure data in accordance with a user operation on the structure data acquired from the structure data processing apparatus 72. For example, various kinds of information can be collected, such as the number of communication terminals 10 that are currently used in a conference, the number of communication terminals 10 for which a communication failure has occurred, a ratio of the number of communication terminals 10 that have ended the conference by a user operation, not by a communication failure, to the number of communication terminals 10 that have ended the conference.

The table/graph generating unit 32 performs visualization processing for visualizing the structure data or the collection data collected by the structure data collecting unit 31 in the form of a table, a graph, or the like.

Structure Data Processing Apparatus

The structure data processing apparatus 72 includes a structure data definition table generating unit 36, a structure data generating unit 37, and a transmission/reception unit 38.

The transmission/reception unit 38 receives a request for the structure data from the data inspecting/analyzing terminal 71 and transmits the structure data. In addition, the transmission/reception unit 38 transmits a request for searching for log data to the log accumulation apparatus 73 and receives the log data that has matched in the search.

In response to a request from an administrator or the like, the structure data definition table generating unit 36 generates the above-described structure data definition table. The generated structure data definition table is stored in association with the ID of the administrator. The log data is not present yet for the generated structure data definition table.

In response to a request for the structure data for which one or more search keys and conditions (e.g., ID or character string) for searching for the search keys are specified, the structure data generating unit 37 requests a search for log data that matches the conditions to the log accumulation apparatus 73 and acquires the log data. Then, the acquired log data is stored in the structure data definition table to generate the structure data.

Log Accumulation Apparatus

The log accumulation apparatus 73 includes a partition processing unit 41, a data storing processing unit 42, a nested structure cancel processing unit 43, and a transmission/reception unit 44. The log accumulation apparatus 73 further includes a log data storage unit 45 that is constructed in the HD 204, the RAM 203, or the like illustrated in FIG. 4.

The log data storage unit 45 accumulates log data in which the nested structure has been canceled, as will be described later. The log data storage unit 45 is divided into partitions 46. The log data is classified into the partitions 46 to be accumulated. Examples of the partition include a folder, a directory, a volume, and the like. The administrator can set the way of setting partitions, and for example, the partitions may be set according to date.

The transmission/reception unit 44, for example, receives the log data from the communication terminal 10 and transmits the log data that matches the search in response to the request for searching for the log data from the structure data processing apparatus 72.

The partition processing unit 41 generates the partitions for storing the log data in a divided manner. The partitions can be set according to the date, the model type, the service usage (information regarding the usage of software), the version of software, or the like of the common log data, for example.

A partition is generated when the following day starts in a case where the partition classification is according to date. In addition, a partition may be generated when the log data is transmitted. If the partition classification is according to the model type of the communication terminal 10, the service usage, the version of software, or the like, the partition processing unit 41 generates a partition in real time when a new model type, service usage, or version of software is confirmed for the first time from the log data.

Since the log data is classified into the partitions, a search range of the log data can be narrowed down, and the search can be performed at a high speed in a case where a search request is transmitted from the structure data processing apparatus 72 with conditions specified.

Note that each partition may have a hierarchical structure. For example, a partition of the model type is generated in a layer lower than a partition of the date, or a partition of the version of software is generated in a layer lower than the partition of the date. Alternatively, the partition of the model type may be generated in a layer lower than the partition of the date, and the partition of the version of software may be generated in a layer lower than the partition of the model type. The depth of layers in lower levels may be freely determined.

The nested structure cancel processing unit 43 converts the log data having a nested structure of layers, which has been transmitted from the communication terminal 10, into log data of one layer. This processing is called cancellation of the nested structure.

On the basis of the log data, the data storing processing unit 42 selects an appropriate partition and stores the log data, for which the nested structure has been canceled, into the partition.

Structure of Log Data

Next, the log data will be described in detail with reference to FIG. 7A to FIG. 13.

Figure 7A:
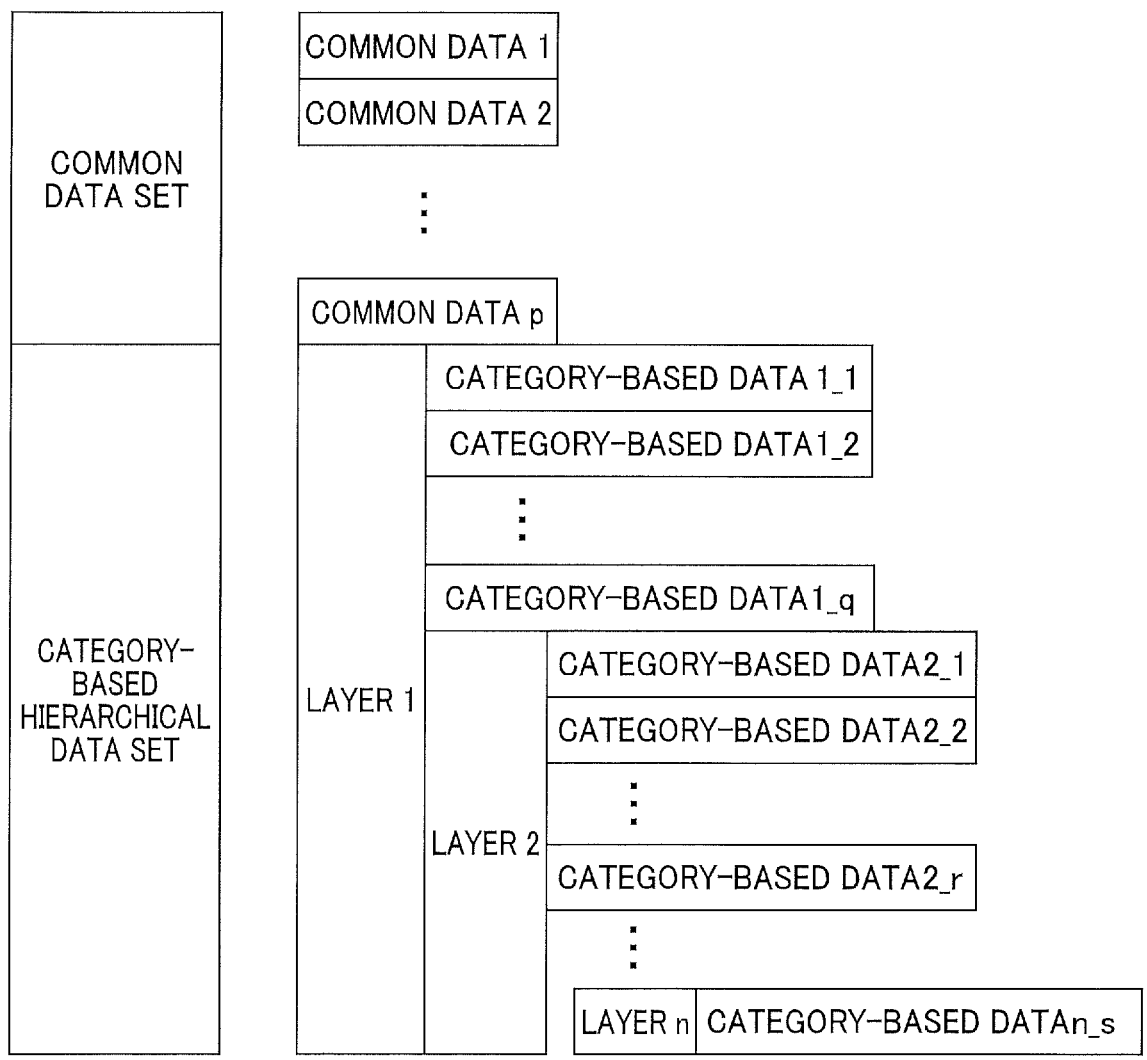

FIGS. 7A and 7B each illustrate a data format of the log data having a structure. The log data is sectioned into a common data set and a category-based hierarchical data set. The common data set is included in all the log data (included regardless of the event) whereas the category-based hierarchical data set differs according to event.

FIG. 7A schematically illustrates the structure of the log data, and FIG. 7B illustrates the log data in the JSON format. As illustrated in FIG. 7A, in the category-based hierarchical data set, Layers 1 to n have a nested structure. That is, the category-based hierarchical data in a lower layer is enclosed in the category-based hierarchical data in a higher layer (that is, Layer i contains Layer i+1).

The category is the type of log data determined in accordance with the event. Specifically, the category is a value that is set as "category" in FIG. 9 and the like.

In a case of occurrence of an event, the communication terminal 10 collects minimum data from the inside of the communication terminal 10. Furthermore, in order to reduce the transmission data amount, the communication terminal 10 makes a hierarchical structure according to the type of category to make the entire log data compact and transmit the log data via the communication network 2.

For example, the category-based data in Layer 2 is determined as being lower than Layer 1, and thus does not have to include information regarding Layer 1. Accordingly, the category-based data in each layer includes only a value, and thereby, the transmission data amount can be reduced.

This is clear from FIG. 7B. For example, while a data item in Layer 1 is "key_1_1: value", a data item in Layer 2 is "key_2_2: value". Since the data in Layer 2 does not have to include information indicating that Layer 2 is lower than Layer 1, and thus, the data size can be reduced. For example, even if the category-based data corresponding to an event has a structure including up to Layer 3, the data size can be reduced.

Figure 8A:
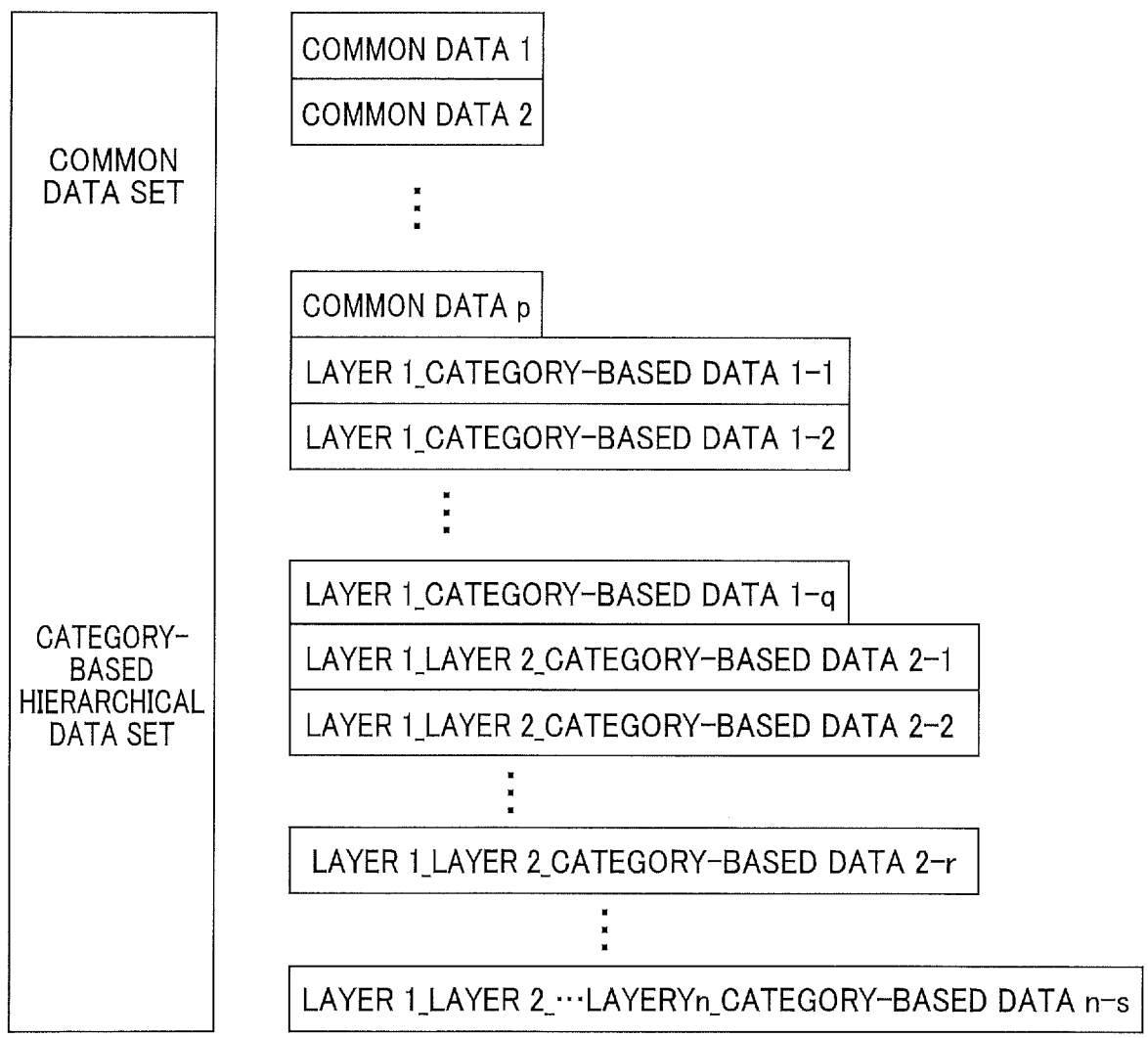

FIGS. 8A and 8B each illustrate a log data structure obtained by converting nested-structure log data into one-layer log data. Conversion of the nested-structure log data into the one-layer log data is called "cancellation of the nested structure".

FIG. 8A schematically illustrates the log data, and FIG. 8B illustrates the log data in the JSON format. Each data item in the log data in FIGS. 8A and 8B has a layer name. As illustrated in FIG. 8A, for example, the data item in Layer 1 has the name "layer 1_category-based data 1-1", and the data item in Layer n has the name "layer 1_layer 2_ . . . layer n_category-based data n-s". That is, each data item has the layer name for reproducing the nested structure so that the original hierarchical structure can be restored even if the nested structure is canceled. Although the description is omitted in this embodiment, the log accumulation apparatus 73 can restore and transmit the nested-structure log data when transmitting the log data.

As illustrated in FIG. 8B, as for the log data in the JSON format, the data item in Layer 1 is "layer_1_key_1_1: value" whereas the data item in Layer n is "layer_1_layer_2_ . . . layer_n_key_n_s: value".

As is clear from comparison between FIG. 7B and FIG. 8B, the nested-structure log data at the time of transmission has a smaller data size. The size of a single log data item is extremely small relative to the network band to be used for communication service, and thus, the log data does not influence the communication service by suppressing the network band of the communication service.

When the log accumulation apparatus 73 receives the log data transmitted from the communication terminal 10, in order to increase the speed of the subsequent data analysis processing, the nested structure cancel processing unit 43 converts the log data in the hierarchical structure into the one-layer log data. The conversion in advance can omit processing for converting the log data in the hierarchical structure into the one-layer log data at each data analysis processing. In addition, the layer names of a plurality of layers are set by being connected with "_" at the head of each element name, and thus, the category can still be recognizable after being converted into the one-layer log data.

Examples of Log Data

Now, some specific examples of the log data will be described with reference to FIG. 9 to FIG. 13. FIG. 9 illustrates an example of the common data in the log data. The common data may be used for collecting the classifications of the log data or for cross-reference analysis of different types of log data items according to category.

As illustrated in FIG. 9, the common data is a log ID, a user ID, a model name, a version number of software or the like, information of a service usage, time of occurrence of an event (generation of a log), a function ID of a generator of the log, the category (classification) of the log, and the like. Note that a specific value is set for "XXXXX . . . ", but is omitted from the illustration.

"log_id": log ID unique for each log
"user_id": user ID
"product": model name
"xx_version": version number of software or the like
"app_info": information of a service usage
"timestamp": time of occurrence of an event (generation of a log)
"func_id": function ID of a generator of the log
"category": type of category corresponding to the event Note that the category of log data being "communication.signaling" means a category of connection processing. The connection processing includes a communication connection request, a communication connection response, start of a communication service, and end of the communication service.

The common data enables, for example, association between log data items in different categories, such as between the log data of connection processing and log data of a questionnaire regarding a user's opinion. The association can be made by using, for example, the user ID, the model name, the software version information, or the like.

FIGS. 10A and 10B each illustrate an example of the category-based hierarchical data in the connection processing. FIG. 10A illustrates the category-based hierarchical data of the communication connection request in the connection processing. "comm_id" of the log data of the communication connection request means the communication service ID (ID unique for each communication connection). The same applies to the following log data items.

"comm_event_type" indicates the type of connection processing. In FIG. 10A, the value indicating the communication connection request is set.

FIG. 10B illustrates the category-based hierarchical data of the communication connection response in the connection processing.

"comm_event_type" indicates the type of connection processing. In FIG. 10B, the value indicating the communication connection response is set.

FIG. 11A illustrates an example of the category-based hierarchical data of the start of a communication service in the connection processing. The log data of the start of the communication service includes a network environment condition, an operation mode that is set in accordance with the network environment condition, and the like.

"comm_event_type" indicates the type of connection processing. In FIG. 11A, the value indicating the log data of the start of communication is set.

"network_protocol": A communication protocol is set.

"network_proxy" indicates whether a proxy server is used or not.

"network_connection": A communication network (e.g., LTE or 5G) used for communication is set.

"xx_comm_mode": A frame rate of an image and a communication speed is set, for example.

FIG. 11B illustrates an example of the category-based hierarchical data of the end of the communication service in the connection processing. The log data of the end of the communication service includes the reason for the end of the communication service and the like.

"comm_event_type" means the type of connection processing. In FIG. 11B, the value indicating the log data of the end of communication is set.

"reason": The reason for disconnection of communication is set. For example, the end caused by a user operation is set. Alternatively, the end caused by a server is set, for example.

FIG. 12A illustrates an example of the category-based hierarchical data of abnormal end of communication. The log data of the abnormal end of communication is log data whose "category" is "communication.error". This log data is generated when the connection fails or when the communication is ended abnormally.

"comm_event_type" means the type of connection processing. In FIG. 12A, the value indicating the log data of the abnormal end of communication is set.

"error_name": The name of communication abnormality is set. For example, the name indicating abnormality that occurs at the start of communication is set.

"error_type": The type of communication abnormality is set. For example, timeout as a result of no response is set.

"error_description": Details of communication abnormality are set. For example, timeout of a response is set.

"state" indicates the state at the time of communication abnormality, such as the start of communication, during calling, during communication, or after communication.

FIG. 12B illustrates an example of the category-based hierarchical data of periodical transmission. The log data of the periodical transmission is log data whose "category" is "communication.service_quality". This log data is data about the quality of the communication service.

"actual_send_audio_bw" indicates an actual value of a communication band used for audio transmission. For example, the value indicating the band (e.g., xx MHz) is set.

"actual_recv_audio_bw" indicates an actual value of a communication band used for audio reception. For example, the value indicating the band (e.g., xx MHz) is set.

"avail_send_audio_bw" indicates a value of an available communication band for audio transmission. For example, the value indicating the band (e.g., xx MHz) is set.

"avail_recv_audio_bw" indicates a value of an available communication band for audio reception. For example, the value indicating the band (e.g., xx MHz) is set.

In addition, values of an available band and an actual band prepared for each type of data to be transmitted and received, such as moving image data, still image data, or document data, may be transmitted.

"rtt" indicates a round trip time between the communication terminal and a destination terminal. For example, a time (e.g., xx milliseconds) is set.

"rssi" indicates a received signal strength indication in a case where the communication line is wireless, for example. For example, a numerical value is set.

FIG. 13A illustrates an example of the category-based hierarchical data to be transmitted as an answer to a questionnaire. After communication has ended, a user is desired to answer a questionnaire, and the answer to the questionnaire is also treated as log data. The log data of the questionnaire is log data whose "category" is "questionnaire.comm_quality".

"answer" indicates an answer to the questionnaire.

"comm_quality_q0001-01" indicates a user evaluation value (level of satisfaction) regarding the communication quality, and is, for example, one out of five grades.

"comm_quality_q0002-01" indicates whether image data has a problem, indicating that the image data has a problem by using "1" and that the image data has no problem by using "0", for example.

"comm_quality_q0002-02" indicates whether audio has a problem, indicating that the audio has a problem by using "1" and that the audio has no problem by using "0", for example.

"comm_quality_q0002-03" similarly indicates whether any other problem is present.

"comm_quality_q0003-01" is a questionnaire of free writing. A user inputs, for example, a sentence "sound was interrupted from when five minutes passed from the start of communication between terminals aa, bb, and cc".

FIG. 13B illustrates an example of the log data to be transmitted as terminal use device information. The terminal use device information is transmitted in response to an event such as the start of communication or change of a device. The log data of the terminal use device information is log data whose "category" is "communication.setting".

"cpu_info" is the product name of the CPU of the communication terminal 10.

"speaker_name" is the product name of a speaker connected to the communication terminal 10.

"mic_name" is the product name of a microphone connected to the communication terminal 10.

"camera_name" is the product name of a camera connected to the communication terminal 10.

"speaker_volume" is a sound volume of the speaker; "mic_volume" is a sound volume of the microphone; "speaker_mute", "mic_mute", and "camera_mute" each indicate whether sound is muted; and "auto_xx_control", "yy_setting", and "xx_comm_mode" indicate various kinds of setting information of the communication terminal 10.

Operation Procedure Before Communication Starts

Next, a process flow of the communication system 1 will be described.

Process in Preparatory Stage

Figure 14:
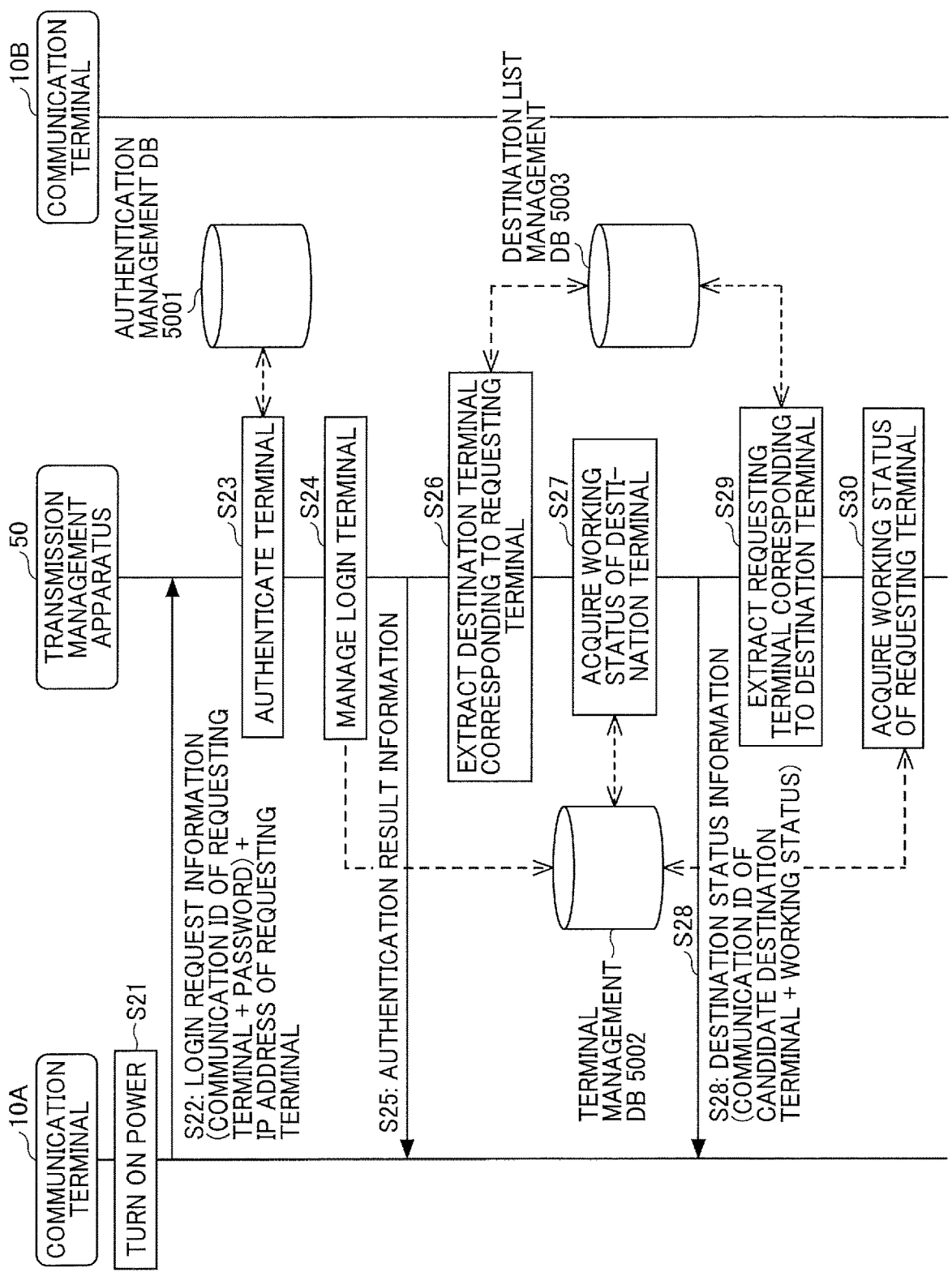
FIG. 14 is a sequence diagram illustrating an example of a process in a preparatory stage before communication in the communication system.

FIG. 14 is a sequence diagram illustrating an example of a process in a preparatory stage before communication in the communication system 1. Herein, as an example, a process in the preparatory stage before a session starts between a communication terminal 10A and a communication terminal 10B will be described. Note that the communication IDs of the communication terminal 10A and of the communication terminal 10B are "01aa" and "01bb", respectively, in the following description.

First, an operator of the communication terminal 10A, which is a requesting terminal, for example, performs an operation for turning on the power of the communication terminal 10A. In response to this, the operation input receiving unit 12 receives the operation for turning on the power, and brings the communication terminal 10A into the on-state (step S21).

Then, in response to the turning on of the power, the communication control unit 13 transmits login request information for requesting login from the transmission/reception unit 11 to the transmission management apparatus 50 via the communication network 2 (step S22). Note that the transmission of the login request information in response to the operation for turning on the power of the communication terminal 10A is an example, and the login request information may be transmitted in response to, for example, the operator's operation on the input device 108, the start of an application, or the like.

In addition, the login request information includes the communication ID (the communication ID of the requesting terminal) for identifying the communication terminal 10A, which is the requesting terminal, and a password. The communication ID and the password are, for example, information that is read from the storage unit 18 via the storing/reading unit 17. In addition, when the login request information is transmitted from the communication terminal 10A to the transmission management apparatus 50, the transmission management apparatus 50, which is a receiver, can acquire the IP address of the communication terminal 10A, which is a transmitter.

Subsequently, by using, as search keys, the communication ID and the password included in the login request information that is received via the transmission/reception unit 51, the terminal authentication unit 52 of the transmission management apparatus 50 searches the above-described authentication management table 602. The terminal authentication unit 52 determines whether the combination of the communication ID and the password included in the login request information received from the communication terminal 10A is included in the authentication management table 602 to authenticate the communication terminal 10A (step S23).

If the terminal authentication unit 52 determines that the login request is from the communication terminal 10A having an authenticated use authority, the terminal management unit 53 changes the working status of the communication terminal 10A with the communication ID "01aa" recorded in the terminal management table 603 to "online (communication is possible)". At this time, the terminal management unit 53 updates the reception date and time, and optionally updates the IP address of the communication terminal 10 (step S24). Thus, in the terminal management table 603, the working status "online (communication is possible)", the reception date and time "20xx. 4. 10 13:40", and the IP address of the communication terminal 10A "1.2.1.3" are associated with the communication terminal 10A with the communication ID "01 aa" for management.

Subsequently, the transmission/reception unit 51 of the transmission management apparatus 50 transmits authentication result information indicating the authentication result obtained by the above-described terminal authentication unit 52 to the communication terminal 10A, which is the requesting terminal that has requested login, via the communication network 2 (step S25). Herein, a case where the terminal authentication unit 52 determines that the communication terminal 10 has an authenticated use authority will be described below.

By using, as a search key, the communication ID "01aa" of the requesting terminal (the communication terminal 10A) that has requested login, the terminal extracting unit 54 of the transmission management apparatus 50 searches the destination list management table 701. Thus, the terminal management unit 53 extracts the communication IDs of candidate destination terminals that can communicate with the requesting terminal (the communication terminal 10A) (step S26). Herein, "10bb", "01cc", and "01dd" are extracted as examples of the communication IDs of candidate destination terminals corresponding with the communication ID "01 aa" of the requesting terminal (the communication terminal 10A).

Subsequently, by using, as search keys, the extracted communication IDs ("01bb", "01cc", and "01dd") of the candidate destination terminals, the terminal extracting unit 54 searches the terminal management table 603. The working status is read for each of the extracted communication IDs, and thus, the working status corresponding to each of the communication IDs ("01bb", "01cc", and "01dd") is acquired (step S27).

Subsequently, the transmission/reception unit 51 transmits, to the requesting terminal (the communication terminal 10A), destination status information including the working status corresponding to each of the communication IDs ("01bb", "01cc", and "01dd") of the candidate destination terminals (step S28). Thus, the requesting terminal (the communication terminal 10A) can acquire the working status corresponding to each of the communication IDs ("01bb", "01cc", and "01dd") of the candidate destination terminals of the requesting terminal (the communication terminal 10A) at the current time.

Furthermore, by using, as a search key, the communication ID "01aa" of the requesting terminal (the communication terminal 10A) that has requested login, the terminal extracting unit 54 of the transmission management apparatus 50 searches the destination list management table 701. Thus, the terminal extracting unit 54 extracts the communication IDs of other requesting terminals for which the communication ID "01aa" of the requesting terminal (the communication terminal 10A) is registered as a candidate destination terminal (step S29). In the destination list management table 701 illustrated in Table 3, the communication IDs of the other requesting terminals to be extracted are "01bb", "01cc", and "01dd".

Subsequently, by using, as a search key, the communication ID "01aa" of the requesting terminal (the communication terminal 10A) that has requested login, the terminal management unit 53 of the transmission management apparatus 50 searches the terminal management table 603. Thus, the terminal management unit 53 acquires the working status of the requesting terminal (the communication terminal 10A) that has requested login (step S30).

Then, from among the communication IDs ("10bb", "01cc", and "10dd") that have been extracted in step S29, the terminal management unit 53 of the transmission management apparatus 50 extracts the communication IDs ("01bb", "01cc", and "01dd") for which the working status is "online (communication is possible)" or "online (during communication)" in the terminal management table 603.

In addition, to the communication terminal 10B that corresponds to one of the extracted communication IDs ("01bb"), the transmission/reception unit 51 transmits destination status information including the communication ID (01aa) and the working status "online (communication is possible)" of the requesting terminal (the communication terminal 10A) (step S31).

The other communication terminals 10, on the other hand, perform a process that is substantially the same as the process in step S22 to S32 in response to an operation for turning on the power or the like, for example.

Communication Process

Figure 15:
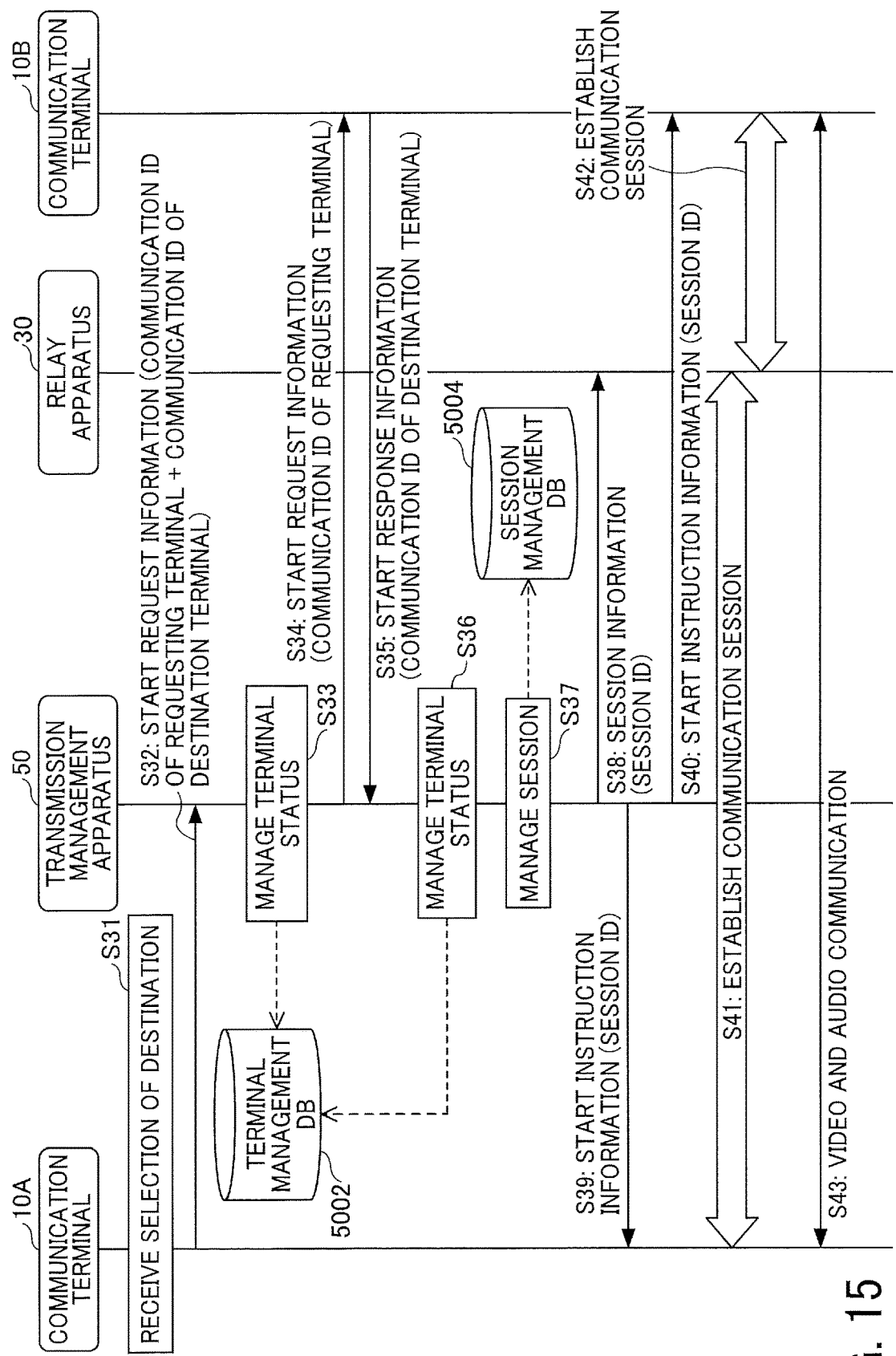
FIG. 15 is a sequence diagram illustrating an example of a communication process in the communication system.

FIG. 15 is a sequence diagram illustrating an example of a communication process in the communication system 1. Herein, an example of a communication management method for starting communication between the communication terminal 10A and the communication terminal 10B will be described.

In step S31, the operation input receiving unit 12 of the communication terminal 10A receives an operation for selecting a destination terminal (the communication terminal 10B) performed by an operator of the communication terminal 10A. Reception of the selection of the destination terminal corresponds to the "communication start operation" in FIG. 16A and FIG. 16B.

The transmission/reception unit 11 of the communication terminal 10A transmits start request information for requesting the start of a session to the transmission management apparatus 50 (step S32). Transmission of the start request information corresponds to the "communication connection request" in FIG. 16A and FIG. 16B. The start request information includes, for example, the communication ID of the requesting terminal, which is the communication terminal 10A, the communication ID of the destination terminal, which is the communication terminal 10B, and the like. The start request information further includes information such as the IP address of the communication terminal 10A (the IP address of the requesting terminal).

In step S33, the terminal management unit 53 of the transmission management apparatus 50 that has received the start request information from the communication terminal 10A, on the basis of the communication ID "01aa" of the requesting terminal (the communication terminal 10A) included in the start request information, updates the terminal management DB 5002. For example, the terminal management unit 53 changes information of the working status corresponding to the communication ID "01aa" of the communication terminal 10A to "online (during communication)", and also updates information on the reception date and time.

In step S34, the session management unit 55 of the transmission management apparatus 50 transmits the start request information for requesting the start of a session to the communication terminal 10B, which is the destination terminal. The start request information includes, for example, the communication ID of the communication terminal 10A, which is the requesting terminal.

In step S35, the communication terminal 10B that has received the start request information from the transmission management apparatus 50 transmits start response information to the transmission management apparatus 50. The start response information includes, for example, the communication ID of the destination terminal of the communication terminal 10B, and the like. In this embodiment, the start response information is transmitted without an operation on the communication terminal 10B. However, the start response information may be transmitted in response to an administrator's operation on the communication terminal 10B.

In step S36, the terminal management unit 53 of the transmission management apparatus 50 that has received the start response information from the communication terminal 10B, on the basis of the communication ID "01bb" of the communication terminal 10B included in the start response information, updates the terminal management DB 5002. For example, the terminal management unit 53 changes information of the working status corresponding to the communication ID "01bb" of the communication terminal 10B to "online (during communication)" and updates information of the reception date and time.

In step S37, the session management unit 55 of the transmission management apparatus 50 allocates a session ID to the session. The session ID is identification information for identifying the session. In addition, the session management unit 55 stores the generated session ID in the session management DB 5004 in association with the communication ID of the requesting terminal (the communication ID of the communication terminal 10A) and the communication ID of the destination terminal (the communication ID of the communication terminal 10B).

In step S38, the session management unit 55 of the transmission management apparatus 50 transmits session information to the relay apparatus 30. The session ID includes, for example, information of the session ID generated in step S37 and the like. On the basis of the session ID, the relay apparatus 30 can acquire the session information from the session management DB 5004.

In step S39, the session management unit 55 of the transmission management apparatus 50 transmits start instruction information as an instruction for starting the session, to the communication terminal 10A. Similarly, in step S40, the session management unit 55 of the transmission management apparatus 50 transmits the start instruction information as an instruction for starting the session, to the communication terminal 10B. The start instruction information includes the session ID, and on the basis of the session ID, the communication terminals 10A and 10B can acquire the session information from the session management DB 5004. The start instruction information corresponds to the "communication connection response" in FIG. 16A and FIG. 16B.

In step S41, on the basis of the start instruction information that has been received, the communication terminal 10A establishes the session with the relay apparatus 30. Similarly, in step S42, on the basis of the start instruction information that has been received, the communication terminal 10B establishes the session with the relay apparatus 30. Thus, the communication terminals 10A and 10B can participate in the same session. That is, the communication service is started. Establishment of the communication session corresponds to "communication service start request+ communication service start response" in FIG. 16A and FIG. 16B.

The communication terminal 10A and the communication terminal 10B participate in the session with the same session ID and transmits and receives content data such as image data or audio data, and thus, for example, a video conference can be performed (S43). Transmission and reception of content data corresponds to "during communication service" in FIG. 16A and FIG. 16B.

During the communication service, log data is transmitted periodically. In addition, if a user performs an operation for disconnecting the communication by depressing a hardware key or a software key, log data of the end of communication is transmitted, and the transmission management apparatus 50 transmits a communication end response. In response to this, the communication terminals 10A and 10B receive the communication service end response, and thereby transmits log data of the communication service end response.

Log Data Transmission Timing

Figure 16B:
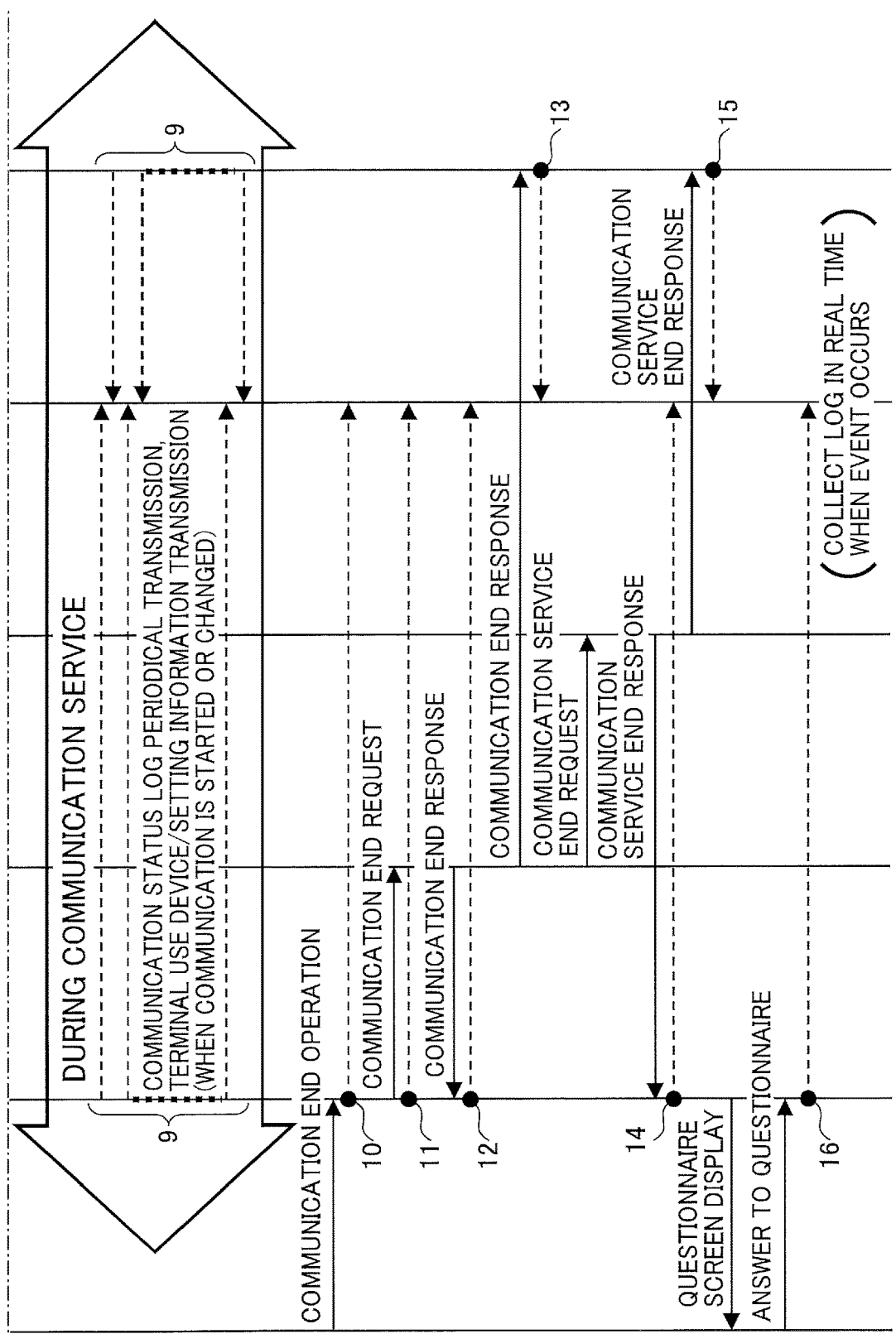

FIG. 16A and FIG. 16B are a diagram illustrating examples of events by which the communication terminals 10A and 10B transmits log data, and the log data transmitted in response to each event. In FIG. 16A and FIG. 16B, each solid arrow indicates a control signal, and each broken arrow indicates transmission of log data. The starting point of each broken arrow extending from the communication terminals 10A and 10B to the log accumulation apparatus 73 in FIG. 16A and FIG. 16B indicates any of Events 1 to 16 that occur in either of the communication terminals 10A and 10B. Now, Events 1 to 16 will be described below.

Event 1: In response to an event in which a user's operation for selecting a destination is received, log data of a communication start operation is transmitted.

Event 2: In response to an event in which start request information is transmitted to the transmission management apparatus 50, log data of a communication connection request is transmitted.

Event 3: In response to an event in which the communication terminal 10B, which is the destination, receives the communication connection request, log data of a communication connection response is transmitted.

Event 4: In response to an event in which the communication terminal 10A, which is the requesting terminal, receives start instruction information from the transmission management apparatus 50, the log data of the communication connection response is transmitted.

Events 5 to 8: In response to establishment of a session, log data of a communication service start request and a communication service start response is transmitted.

Event 9: During the communication service, log data is transmitted periodically. The event in which the log data is transmitted periodically is, for example, a periodical event corresponding to time up of a timer.

Event 10: In response to an event in which a communication end operation (disconnection) performed by a user is received, log data of a communication end request is transmitted.

Event 11: In response to an event in which the communication end request is transmitted to the transmission management apparatus 50, log data of the communication end request is transmitted.

Event 12: In response to an event in which the communication terminal 10A receives a communication end response from the transmission management apparatus 50, log data of the communication end response is transmitted.

Event 13: Since the communication terminal 10B is notified of the end of communication, in response to an event in which the communication terminal 10B receives this notification, the log data of the communication end response is transmitted.

Events 14 and 15: In response to an event in which information indicating disconnection of the communication service (session) is transmitted from the relay apparatus 30, log data of a communication service end response is transmitted.

Event 16: In response to occurrence of an answer event in which a user transmits an answer to a questionnaire, log data of the answer to the questionnaire is transmitted to the log accumulation apparatus 73.

In the above manner, each of the communication terminals 10 according to this embodiment does not accumulate the log data in the communication terminal 10, but can transmit the log data from the communication terminal 10 in response to each event occurrence even during the communication service.

Thus, even if abnormality occurs, such as disconnection of a network line or stop of the communication terminal 10 during the communication service, the log data obtained immediately before the abnormality occurrence can be transmitted from the communication terminal 10 to the log accumulation apparatus 73. An administrator or the like can timely analyze the log data obtained immediately before the abnormality occurrence.

Log Data Transmission Process by Communication Terminal

FIG. 17 is an example of a sequence diagram illustrating a process in which the communication terminal 10 generates and transmits log data.

S51: An event occurs in the communication terminal 10.

S52: The function-based log generating unit 23 detects the event occurrence and first generates category-based hierarchical data in accordance with the event.

S53: The function-based log generating unit 23 transmits, to the log generation processing unit 21, a log transmission request. The log transmission request includes a category and the category-based hierarchical data.

S54: The log generation processing unit 21 causes the common log generating unit 22 to generate common log data and generates log data having a nested structure.

S55: The log generation processing unit 21 transmits the log transmission request to the log transmission control unit 19.

S56: The log transmission control unit 19 transmits the log transmission request to the transmission/reception unit 11.

S57: The log transmission control unit 19 manages a retransmission timer and the maximum number of times of transmission. If a fixed period of time elapses from the last-time transmission of the log data, and if the number of times of transmission is less than the maximum number, the log transmission control unit 19 transmits the log transmission request to the transmission/reception unit 11. Thus, in a case of communication abnormality, transmission can be attempted for the maximum number of times of transmission.

S58: The transmission/reception unit 11 transmits the log data to the log accumulation apparatus 73.

S59: The transmission/reception unit 44 of the log accumulation apparatus 73 receives the log data, and the data storing processing unit 42 causes the log data to be stored in a predetermined partition, as will be described later.

S60 to S63: A log transmission result is transmitted from the log accumulation apparatus 73 to the communication terminal 10. If the log transmission result is not delivered to the communication terminal 10, retransmission is performed as long as the number of times of transmission is less than or equal to the maximum number.

Log Data Accumulation Process by Log Accumulation Apparatus

Figure 18:
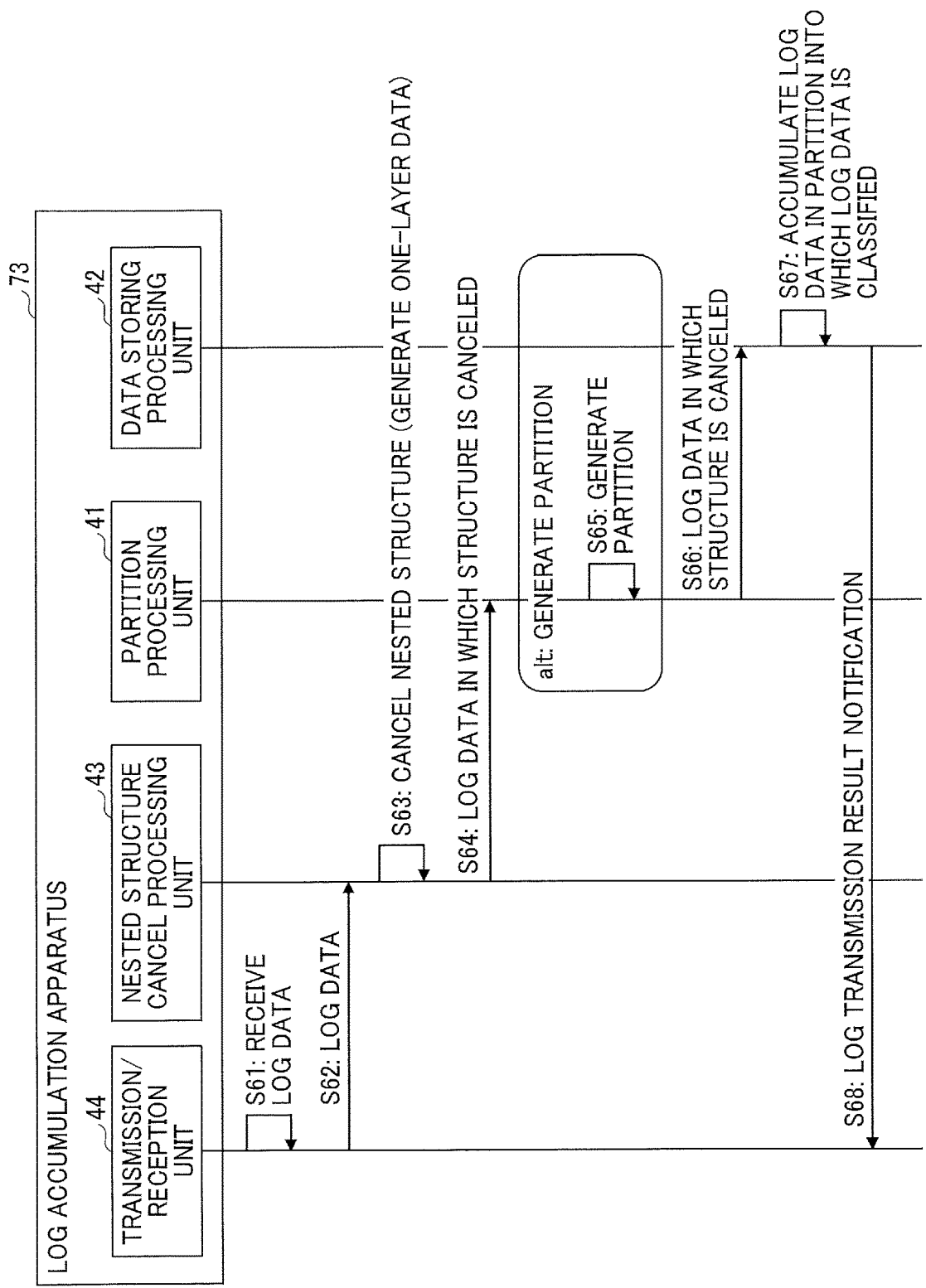
FIG. 18 is a sequence diagram illustrating an example of a process in which the log accumulation apparatus accumulates log data.

FIG. 18 is an example of a sequence diagram illustrating a process in which the log accumulation apparatus 73 accumulates log data.

S61: The transmission/reception unit 44 of the log accumulation apparatus 73 receives log data from the communication terminal 10.

S62: In order to cancel a nested structure, the transmission/reception unit 44 transmits the log data to the nested structure cancel processing unit 43.

S63: The nested structure cancel processing unit 43 cancels the nested structure (generates one-layer log data).

S64: The nested structure cancel processing unit 43 transmits the log data in which the nested structure has been canceled, to the partition processing unit 41.

S65: The partition processing unit 41 determines whether a partition is to be generated, and if the partition is to be generated, generates the partition. The partition is to be generated in a case where, although partitions are classified according to model type, service usage, version of software, or the like, a new model type, service usage, version information, or the like is confirmed for the first time from the log data. Note that, for example, in a case where the partition classification is according to date, the partition is generated when the following day starts, and the partition does not have to be generated when the log data is received.

S66: After generating the partition or without generating the partition, the partition processing unit 41 transmits the log data in which the nested structure has been canceled, to the data storing processing unit 42.

S67: The data storing processing unit 42 accumulates the log data in a partition into which the log data is classified.

S68: The data storing processing unit 42 transmits a log transmission result notification to the transmission/reception unit 44. Thus, the log transmission result notification is transmitted to the communication terminal 10.

Log Data Inspection Process

Next, a process in which log data accumulated in the log accumulation apparatus 73 is inspected will be described with reference to FIG. 19 to FIG. 21.

Figure 19:
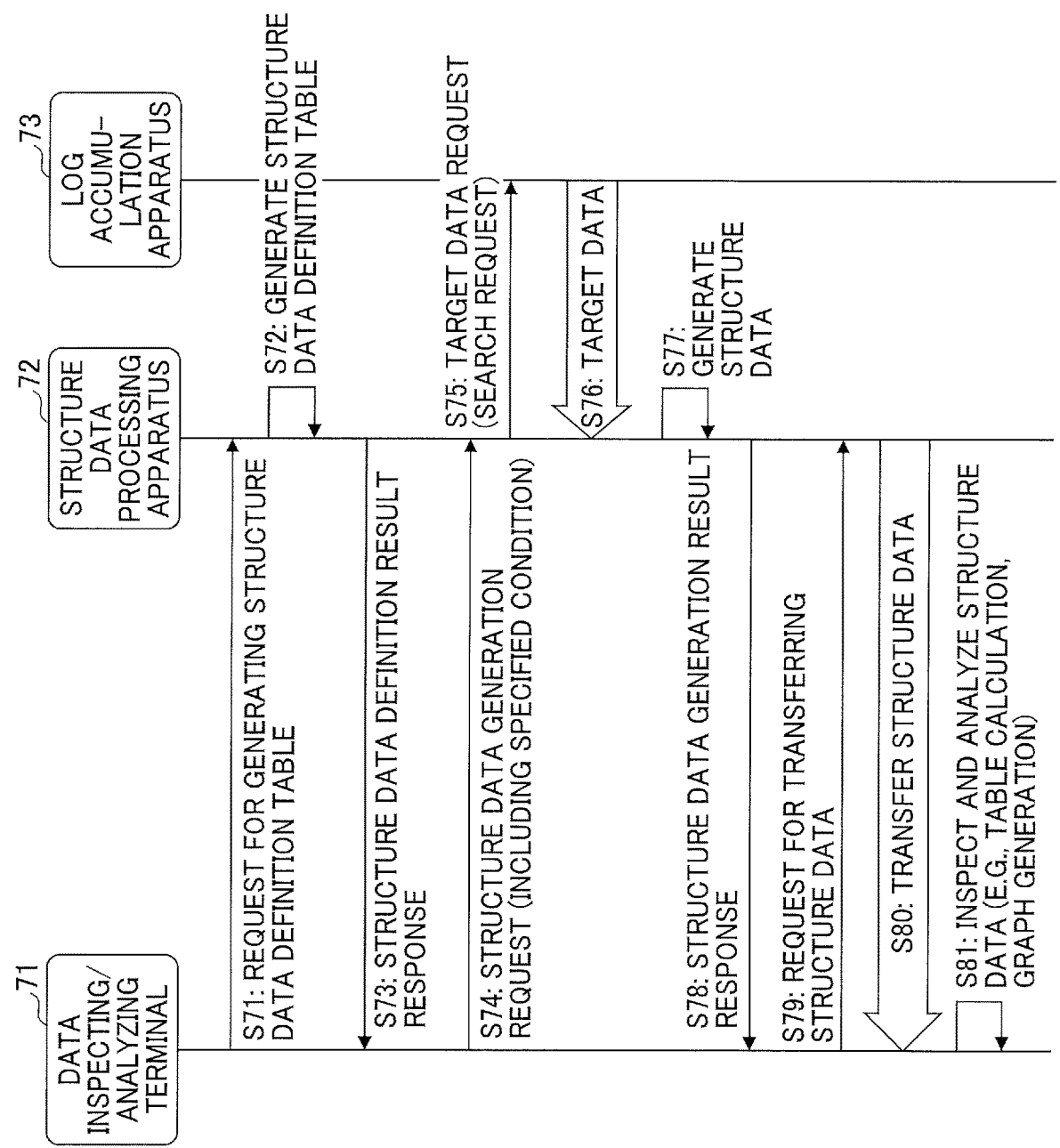
FIG. 19 is a sequence diagram illustrating an example of a process in which the data inspecting/analyzing terminal inspects log data.

FIG. 19 is an example of a sequence diagram illustrating a process in which the data inspecting/analyzing terminal 71 inspects log data. Although an example in which a user operates the data inspecting/analyzing terminal 71 is illustrated in FIG. 19, the data inspecting/analyzing terminal 71 may be present in cloud.

S71: An administrator or the like defines in advance the structure data definition table for log data that is to be inspected. The number of structure data definition tables to be generated is not limited. Thus, the transmission/reception unit 35 of the data inspecting/analyzing terminal 71 transmits a request for generating a structure data definition table to the structure data processing apparatus 72. The request for generating a structure data definition table includes a search key for typical database operation. For example, the search key may be data included in the log data, such as the category, the date, or the communication ID.

S72: The transmission/reception unit 38 of the structure data processing apparatus 72 receives the request for generating a structure data definition table, and the structure data definition table generating unit 36 generates the structure data definition table.

S73: The transmission/reception unit 38 transmits a structure data definition result response to the data inspecting/analyzing terminal 71.

S74: The administrator or the like specifies a range (e.g., period of time) or a condition (whether specified characters are included or not in the data) of the log data to be acquired from the structure data definition table that is to be inspected. The operation receiving unit 33 of the data inspecting/analyzing terminal 71 receives such specification, and the transmission/reception unit 35 transmits a structure data generation request to the structure data processing apparatus 72. The structure data generation request includes the specified condition.

S75: The transmission/reception unit 38 of the structure data processing apparatus 72 receives the structure data generation request, and the structure data generating unit 37 requests the log accumulation apparatus 73 for target data included in the specified condition.

S76: The transmission/reception unit 44 of the log accumulation apparatus 73 transmits log data that matches the specified condition, to the structure data processing apparatus 72.

S77: The transmission/reception unit 38 of the structure data processing apparatus 72 receives the log data that matches the specified condition, and the structure data generating unit 37 stores the log data in the structure data definition table to generate the structure data.

S78: The transmission/reception unit 38 transmits a structure data generation result response, to the data inspecting/analyzing terminal 71. The structure data is not transmitted at this time point.

S79: On the basis of the structure data generation result response, the transmission/reception unit 35 of the data inspecting/analyzing terminal 71 determines that the structure data has been generated and transmits a request for transferring the structure data, to the structure data processing apparatus 72.

S80: In response to the request for transferring the structure data, the transmission/reception unit 38 of the structure data processing apparatus 72 transmits the structure data in which the log data has been set, to the data inspecting/analyzing terminal 71.

S81: The transmission/reception unit 35 of the data inspecting/analyzing terminal 71 receives the structure data, the structure data collecting unit 31 collects the structure data, for example, and the table/graph generating unit 32 visualizes the structure data in the form of a table, a graph, or the like.

Log Data Analysis Example

Figure 20:
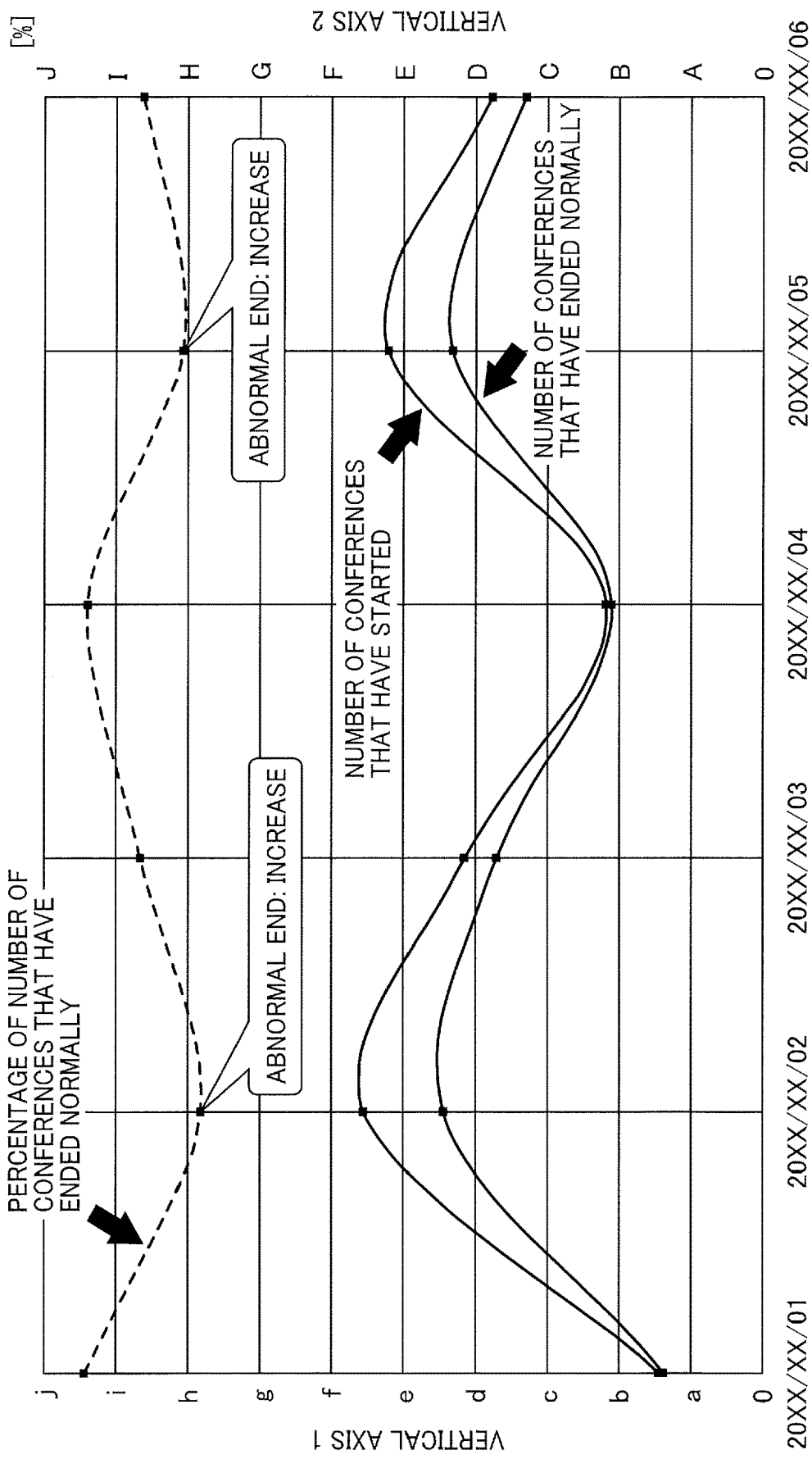
FIG. 20 is an example of a graph in which the data inspecting/analyzing terminal analyzes and displays structure data.

FIG. 20 is an example of a graph in which the data inspecting/analyzing terminal 71 analyzes and displays structure data. In the graph in FIG. 20, the horizontal axis represents the date, the vertical axis 1 represents the number of conferences that have started and the number of conferences that have ended normally, and the vertical axis 2 represents a percentage of the number of conferences that have ended normally. Note that this data is originally discrete data according to date, but is interpolated in FIG. 20 by using a spline curve or the like.

The number of conferences that have started is the number of log data items for which the communication service start has been confirmed in a certain range (e.g., country, area, or office). The number of conferences that have ended normally is the number of log data items for which the communication end request has been confirmed. That is, the number of conferences that have ended normally is the number of conferences in which the communication service has been ended by a user operation, not by a communication failure or the like.

The percentage of the number of conferences that have ended normally is (the number of conferences that have ended normally÷the number of conferences that have started) 100 [%]. There is correlation in that the percentage of the number of conferences that have ended normally decreases as the number of conferences that have started or the number of conferences that have ended normally increases. This is considered to be because the communication bands become short as the number of conferences increases.

Figure 21:
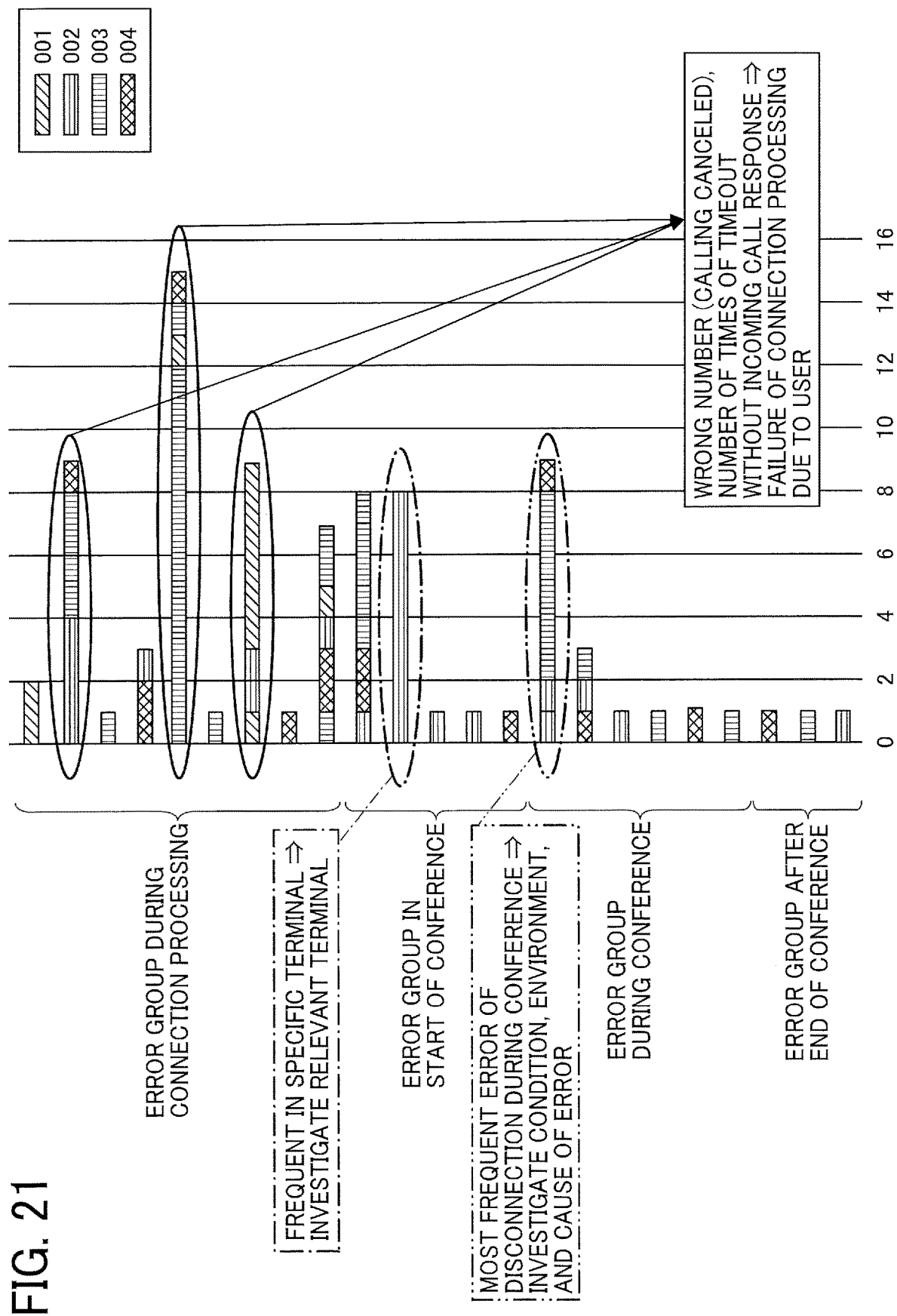
FIG. 21 is an example of a graph in which the data inspecting/analyzing terminal analyzes and displays the structure data.

FIG. 21 is an example of a graph in which the data inspecting/analyzing terminal 71 analyzes and displays the structure data. FIG. 21 illustrates the number of errors that have occurred according to the type of error for each communication terminal 10 during the following phases: during the connection processing; at the start of a communication service; during the communication service, and after the end of the communication service. The error during the connection processing is, for example, the absence of a response regardless of connection to the destination terminal; the error at the start of a conference is, for example, a failure of start of a conference for a certain reason; the error during the conference is, for example, disconnection during the conference; and the error after the end of the conference is, for example, the absence of an end response.

For example, in a case where the same error occurs frequently in a specific communication terminal 10, it can be determined that the relevant communication terminal 10 is to be investigated.

In addition, in a case where a large number of errors occur in a certain phase, it is found that the communication procedure or system during this phase is to be improved.

The analysis examples in FIG. 20 and FIG. 21 are merely examples, and the data inspecting/analyzing terminal 71 can analyze the log data by various analysis methods. For example, by using software version B of a model type A, the data inspecting/analyzing terminal 71 can statistically acquire when and how many events or errors have occurred or the time slot during which an event or an error frequency occurs.

Questionnaire

In the related art, no questionnaire has been made each time a communication service has ended in the communication system 1. In a case where a user is not satisfied but is not willing to contact the support center, the communication system could not acquire the user's dissatisfaction. Accordingly, in the communication system 1 according to this embodiment, after the communication service has ended, a questionnaire screen is displayed on the communication terminal 10 to prompt the user to answer the questionnaire.

FIGS. 22A and 22B are examples of questionnaire screens that the communication terminal 10 causes the display 120 to display. FIG. 22A illustrates a point input screen 501, and FIG. 22B illustrates a details input screen 511. The point input screen 501 has point selection buttons 502 by which the user inputs the level of satisfaction regarding the communication quality in five grades with a mouse or a touch panel. If the user selects "3", for example, the numbers 1 to 3 in circles are displayed in an emphasized manner (e.g., in red).

The point input screen 501 has a details input button 503. If the user depresses the details input button 503, the details input screen 511 in FIG. 22B is displayed. The details input screen 511 has the following items "video", "audio", "document sharing", "at the time of connection", "other problems" as examples of problems of the communication quality, and selection buttons 512 therefor. The user can freely select one or more problems.

The details input screen 511 further has a free writing box 513. The user can specifically input what kind of problem occurred, in the free writing box 513. The user's inputs on the questionnaire screen are received by the operation input receiving unit 12, and the log generation processing unit 21 generates the log data.

In the above manner, by collecting the questionnaire data, the quality of a conference that the user felt, including audio quality, which is difficult to acquire as a log, can be measured as a numerical value. For example, the level of satisfaction regarding a conference with slightly poor audio processing is compared with that regarding a conference without such a problem, and it is confirmed that the level of satisfaction regarding the conference without the slightly poor audio processing is higher.

Thus, the questionnaire allows an administrator of the communication system to acquire, as the numerical value, the quality that the user felt after program update or the level of improvement in the quality that the user felt after answering an inquiry (for corporate customer). In addition, the administrator of the communication system can detect an item in the log data having a high correlation with the level of satisfaction according to the questionnaire through machine learning or the like for improvement, and thus cross-reference analysis of the log data is possible.

In the related art, the communication terminal accumulates the log data inside, and the log data is collected at a specific timing to be transmitted to a log accumulation apparatus. By this method, since the log data size is large, it is not possible to transmit the log data during the communication service. That is, the large-capacity log data suppresses the communication band for the communication service, which results in degradation of the communication service equality. Accordingly, the log data is transmitted only after the communication service has ended.

In addition, if the communication service is ended abnormally, no log data accumulated in the communication terminal during the communication service is transmitted to a server apparatus.

Furthermore, immediately after the communication service has ended, a user turns off the power of the communication terminal in many cases. Thus, in a case where the communication speed is low or where the log data size is large, there is no time for transmitting the log data, the log data transmission is interrupted, and the log data is not collected.

In addition, in a case where an administrator or the like of the communication system investigates a failure that occurs during the communication service, it is not possible to collect the log data in real time during the communication service to check against the failure occurrence situation to perform analysis concurrently.

As described above, the communication system according to this embodiment transmits the log data in real time in response to occurrence of an event such as connection processing for performing communication by the communication terminal 10, the period during the communication service, or the end of communication. Thus, it is possible to achieve at least one of the following: transmitting of the log data during the communication service; preventing no log data from being transmitted to the server apparatus; and analyzing log data concurrently with checking against the failure occurrence situation.

In addition, since the log data has the same format regardless of the function, it is possible to extract the log data of a given function by a predetermined specification method or to analyze log data items of different functions in association with each other.

Furthermore, the log data transmitted by the communication terminal 10 has a nested structure. This can minimize the data size of a log data item related to each event. In addition, since the common data is set in all the log data, by using the common data, the data can be easily collected, narrowed down, and associated by using the common data while being analyzed.

Other Applications

Although the embodiment of the present disclosure has been described above with reference to the examples, the present disclosure is not limited to these examples and may be modified or replaced in various manners without departing from the spirit of the present disclosure.

For example, although the above embodiment has described the log data of the communication terminal 10, the log data is not limited to the log data of the communication terminal 10. For example, the present disclosure is similarly applicable to log data of an electronic whiteboard used in a video conference. The present disclosure is also applicable to log data of a communication device such as a car navigation terminal, a remote-controlled drone, remote-controlled medical equipment, and the like.

In addition, the log data may be transmitted in response to, as an event, a user's explicit operation for transmitting the log data, or an instruction for transmitting the log data from the transmission management apparatus 50.

Furthermore, although the communication terminal 10 transmits the log data in the above embodiment, the transmission management apparatus 50 may generate the log data. In this case, the communication terminal 10 transmits relevant information to the transmission management apparatus 50 when an event occurs. In addition, the communication terminal 10 may transmit the log data to the log accumulation apparatus 73 via the transmission management apparatus 50, not directly to the log accumulation apparatus 73.

In addition, although the communication terminal 10 performs communication via the in the above embodiment, the communication terminal 10 may perform communication without the relay apparatus 30. Examples of a known communication protocol for such communication include Web Real-Time Communication (WebRTC).

Although the above embodiment has described that the communication terminal 10 transmits the log data in response to each event, for example, log data items may be collectively transmitted each time N (>1) log data items are stored. Alternatively, the log data may be transmitted periodically. In this case, one or more log data items generated in a period are transmitted.

In addition, the configuration examples in FIG. 5A, FIG. 5B, FIG. 6A and FIG. 6B, and the like are obtained by dividing the processing in units of main functions for easy understanding of the processing performed by the transmission management apparatus 50, the communication terminal 10, and the log collection/analysis system 70. The present disclosure is not limited by the units into which the processing is divided or by means of the names thereof. The processing performed by the transmission management apparatus 50, the communication terminal 10, and the log collection/analysis system 70 may be divided into more processing units in accordance with details of the processing. A single processing unit may be subdivided so as to include more processing subunits.

Furthermore, although the above embodiment has described the transmission management apparatus 50 and the relay apparatus 30 as separate apparatuses for the convenience of description, an apparatus integrating the functions of both of the apparatuses may provide the functions of the transmission management apparatus 50 and the relay apparatus 30.

In addition, the communication system 1 may include a plurality of transmission management apparatuses 50, and the functions of the transmission management apparatuses 50 may be provided in a plurality of servers in a dispersed manner.

Note that the log generation processing unit 21 is an example of log data generating means, the log transmission control unit 19 is an example of log data transmission means, the common log generating unit 22 is an example of common data generating means, and the function-based log generating unit 23 is an example of event-based data generating means.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication system comprising:
a plurality of communication terminals;
a transmission management apparatus configured to start a communication session between one of the plurality of communication terminals and at least one other communication terminal of the plurality of communication terminals; and
an accumulation apparatus; wherein
the plurality of communication terminals, the transmission management apparatus, and the accumulation apparatus are interconnected via a network;
the plurality of communication terminals are configured to perform communication via the communication session started by the transmission management apparatus;
each of the plurality of communication terminals includes a central processing unit (CPU) and a memory storing a computer program that causes the CPU to implement functions of
an operation input receiving unit configured to receive inputs of information from a user,
a display control unit configured to display an input screen on a display device,
a communication control unit configured to perform communication controls,
a log information generating unit configured to receive a notification of occurrence of an event from at least the operation input receiving unit or the communication control unit, and
a log transmission control unit;
the log information generating unit is configured to,
in response to occurrence of an event,
receive a notification of occurrence of the event from the operation input receiving unit in a case in which the event has occurred in the operation input receiving unit,
receive a notification of occurrence of the event from the communication control unit in a case in which the event has occurred in the communication control unit,
generate common data that is common to all log data regardless of the event that has occurred,
generate event-based data in accordance with the event that has occurred, and
generate the log data in a predetermined format by using the common data and the event-based data, such that the event-based data enclosed in the log data in the predetermined format has a hierarchical structure and the event-based data of a relatively lower layer is enclosed in the event-based data of a relatively higher layer; and
the log transmission control unit is configured to transmit the log data generated by the log information generating unit to the accumulation apparatus each time the event occurs; and
the accumulation apparatus is configured to, in response to receiving the log data from one of the communication terminals,
cancel the hierarchical structure of the event-based data included in the received log data in order to generate one-layer log data, and
accumulate the generated one-layer log data.

2. A log data transmission method in a communication system including a plurality of communication terminals; a transmission management apparatus configured to start a communication session between one of the plurality of communication terminals and at least one other communication terminal of the plurality of communication terminals; and an accumulation apparatus, each of the plurality of communication terminals, the transmission management apparatus, and the accumulation apparatus being, interconnected via a network, the plurality of communication terminals being configured to perform communication via the communication session started by the transmission management apparatus, and each of the plurality of communication terminals including a central processing unit (CPU) and a memory storing a computer program that causes the CPU to implement functions of an operation input receiving unit configured to receive inputs of information from a user, a communication control unit configured to perform communication controls, a log information generating unit configured to receive a notification of occurrence of an event from at least the operation input receiving unit or the communication control unit, and a log transmission control unit: wherein the method comprises:
in response to occurrence of an event in a communication terminal of the plurality of communication terminals,
receiving, by the log information generating unit of the communication terminal, a notification of occurrence of the event from the operation input receiving unit in a case in which the event has occurred in the operation input receiving unit;
receiving, by the log information generating unit of the communication terminal, a notification of occurrence of the event from the communication control unit operation in a case in which the event has occurred in the communication control unit;
generating log data by the log information generating unit of the communication terminal;
transmitting, by the log transmission control unit of the communication terminal, the log data generated in the generating to the accumulation apparatus each time the event occurs; and
receiving, by the accumulation apparatus, the log data from the communication terminal; wherein
the generating of the log data includes
generating common data that is common to all log data regardless of the event that has occurred,
generating event-based data in accordance with the event that has occurred, and
generating the log data in a predetermined format by using the common data and the event-based data, such that the event-based data enclosed in the log data in the predetermined format has a hierarchical structure and the event-based data of a relatively lower layer is enclosed in the event-based data of a relatively higher layer; and
the receiving of the log data, includes
canceling the hierarchical structure of the event-based data included in the received log data in order to generate one-layer log data, and
accumulating the generated one-layer log data.

3. The communication system of claim 1,
wherein the event is an event pertaining to connection processing.

4. The communication system of claim 3,
wherein the connection processing is a communication connection request, a communication connection response, a start of a communication service, or an end of communication.

5. The communication system of claim 4,
wherein the log information generating unit is further configured to generate the event-based data indicating a communication speed or details of a communication network after the communication connection response is received from the transmission management apparatus.

6. The communication system of claim 1,
wherein the log information generating unit is further configured to:
generate the event-based data indicating details of an operation of a user on the communication terminal in response to receiving the operation as the event; and
the log transmission control unit is configured to transmit the log data to the accumulation apparatus at each time of the event of the operation.

7. The communication system of claim 1,
wherein the log information generating unit is further configured to:
generate the event-based data indicating details of an error in response to receiving the notification of occurrence of the error as the event; and
the log transmission control unit is configured to transmit the log data to the accumulation apparatus at each time of the event of the occurrence of the error.

8. The communication system of claim 1,
wherein the log information generating unit of one of the plurality of communication terminals is configured to:
generate the event-based data regarding a communication quality in response to receiving the notification of occurrence of a periodical event during communication with the at least one other communication terminal of the plurality of communication terminals; and
the log transmission control unit of one of the plurality of communication terminals is configured to transmit the log data to the accumulation apparatus each time the periodical event occurs.

9. The communication system of claim 1,
wherein the log information generating unit of one of the plurality of communication terminals is configured to:
in response to receiving an event of an answer to a questionnaire regarding a level of satisfaction regarding a communication service after communication with the at least one other communication terminal of the plurality of communication terminals has ended, generate the event-based data including the answer to the questionnaire; and
the log transmission control unit of one of the plurality of communication terminals is configured to transmit the log data including the answer to the questionnaire.

10. The communication system of claim 9,
wherein
the input screen is for inputting the answer to the questionnaire;
the operation input receiving unit is configured to receive the answer to the questionnaire from a user via the input screen; and
the answer to the questionnaire includes free writing of the user regarding the communication service.

11. The communication system of claim 1,
wherein in a case where transmission of the log, data to the accumulation apparatus has failed, the log transmission control unit is further configured to attempt to perform retransmission to a predetermined maximum number of times of transmission.

* * * * *